(12) United States Patent
Arredondo et al.

(10) Patent No.: US 8,484,065 B1
(45) Date of Patent: Jul. 9, 2013

(54) SMALL ENHANCEMENT PROCESS WORKFLOW MANAGER

(75) Inventors: Barbara Arredondo, Dallas, TX (US); Gale Y. Campbell, Olathe, KS (US); Philip Issa, Irving, TX (US); Lih-Jong Ma, Irving, TX (US); Robert J. Vick, Coppell, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1392 days.

(21) Appl. No.: 11/181,154

(22) Filed: Jul. 14, 2005

(51) Int. Cl.
*G06Q 10/00* (2012.01)

(52) U.S. Cl.
USPC ........... 705/7.27; 705/301; 717/101; 717/102

(58) Field of Classification Search
USPC .................... 705/7.27, 301; 717/101, 102
See application file for complete search history.

(56) References Cited

U.S. PATENT DOCUMENTS

| | | | |
|---|---|---|---|
| 5,208,765 A | 5/1993 | Turnbull | |
| 5,548,506 A | 8/1996 | Srinivasan | |
| 5,557,515 A | 9/1996 | Abbruzzese et al. | |
| 5,692,125 A | 11/1997 | Schloss et al. | |
| 5,729,746 A | 3/1998 | Leonard | |
| 5,758,328 A | 5/1998 | Giovannoli | |
| 5,765,140 A | 6/1998 | Knudson et al. | |
| 5,784,539 A | 7/1998 | Lenz | |
| 5,815,152 A * | 9/1998 | Collier et al. | 715/839 |
| 5,848,393 A * | 12/1998 | Goodridge et al. | 705/8 |
| 5,864,480 A | 1/1999 | Ladd | |
| 5,893,074 A | 4/1999 | Hughes et al. | |
| 5,930,798 A | 7/1999 | Lawler et al. | |
| 5,949,999 A | 9/1999 | Song et al. | |
| 5,960,200 A | 9/1999 | Eager et al. | |
| 5,974,392 A * | 10/1999 | Endo | 705/8 |
| 5,999,908 A | 12/1999 | Abelow | |
| 6,011,917 A | 1/2000 | Leymann et al. | |
| 6,289,502 B1 | 9/2001 | Garland et al. | |
| 6,324,647 B1 | 11/2001 | Bowman-Amuah | |
| 6,405,364 B1 * | 6/2002 | Bowman-Amuah | 717/101 |
| 6,424,948 B1 * | 7/2002 | Dong et al. | 705/9 |
| 6,505,176 B2 * | 1/2003 | DeFrancesco et al. | 705/38 |
| 6,519,571 B1 * | 2/2003 | Guheen et al. | 705/14.66 |
| 6,574,605 B1 * | 6/2003 | Sanders et al. | 705/8 |
| 6,601,234 B1 | 7/2003 | Bowman-Amuah | |
| 6,636,585 B2 * | 10/2003 | Salzberg et al. | 379/22 |
| 6,658,643 B1 | 12/2003 | Bera | |
| 6,662,357 B1 | 12/2003 | Bowman-Amuah | |

(Continued)

OTHER PUBLICATIONS

Upside Software, Inc., Using UpsideContract's Workflow Engine to Improve Business Processes (Nov. 2004), pp. 1-2. Accessed from: www.upsidesoft.com/upside+software/.../ BP%20Workflow%20FINAL%20110404.pdf.*

(Continued)

*Primary Examiner* — Andre Boyce
*Assistant Examiner* — Tiphany Dickerson

(57) ABSTRACT

A computer-implemented system for selecting a workflow path of a project is provided. The system includes an initial phase, an evaluation phase, a completion phase, and a criteria engine. The evaluation phase of the project includes a plurality of workflow paths for the project based on criteria of the project. Each of the plurality of paths include one or more steps of the evaluation phase. The criteria engine is operable to evaluate project criteria of the project at one or more steps in the evaluation phase and route the project to at least another step in the evaluation phase based on the project criteria.

15 Claims, 18 Drawing Sheets

U.S. PATENT DOCUMENTS

| | | | |
|---|---|---|---|
| 6,671,818 B1 | 12/2003 | Mikurak | |
| 6,684,191 B1 | 1/2004 | Barnard et al. | |
| 6,694,329 B2 | 2/2004 | Murray | |
| 6,721,713 B1 | 4/2004 | Guheen et al. | |
| 6,732,028 B2 | 5/2004 | Vanstory et al. | |
| 6,799,145 B2 | 9/2004 | Kennedy et al. | |
| 6,832,202 B1* | 12/2004 | Schuyler et al. | 705/8 |
| 6,865,565 B2 | 3/2005 | Rainsberger et al. | |
| 6,904,593 B1 | 6/2005 | Fong et al. | |
| 6,961,687 B1 | 11/2005 | Myers, Jr. et al. | |
| 6,964,044 B1 | 11/2005 | Hudson et al. | |
| 6,973,640 B2 | 12/2005 | Little et al. | |
| 6,990,437 B1 | 1/2006 | Abu El Ata | |
| 7,047,518 B2 | 5/2006 | Little et al. | |
| 7,051,036 B2 | 5/2006 | Rosnow et al. | |
| 7,092,968 B1 | 8/2006 | Ebel et al. | |
| 7,101,031 B2 | 9/2006 | Medin | |
| 7,139,999 B2 | 11/2006 | Bowman-Amuah | |
| 7,162,427 B1 | 1/2007 | Myrick et al. | |
| 7,212,987 B2 | 5/2007 | Swanke et al. | |
| 7,240,325 B2 | 7/2007 | Keller | |
| 7,292,990 B2 | 11/2007 | Hughes | |
| 7,321,864 B1 | 1/2008 | Gendler | |
| 7,330,822 B1 | 2/2008 | Robson et al. | |
| 7,350,185 B2 | 3/2008 | Sparago et al. | |
| 7,360,201 B2 | 4/2008 | Srivastava | |
| 7,389,217 B2 | 6/2008 | Benny et al. | |
| 7,395,540 B2 | 7/2008 | Rogers | |
| 7,403,948 B2* | 7/2008 | Ghoneimy et al. | 707/792 |
| 7,430,498 B2 | 9/2008 | Butterfield et al. | |
| 7,475,107 B2 | 1/2009 | Maconi et al. | |
| 7,487,079 B2 | 2/2009 | Benny et al. | |
| 7,490,319 B2 | 2/2009 | Blackwell et al. | |
| 7,559,049 B1* | 7/2009 | Hemmat et al. | 717/102 |
| 7,631,297 B2 | 12/2009 | Childress et al. | |
| 7,640,531 B1 | 12/2009 | Akram et al. | |
| 7,653,592 B1* | 1/2010 | Flaxman et al. | 705/38 |
| 7,664,664 B2* | 2/2010 | King et al. | 705/7.28 |
| 7,685,013 B2* | 3/2010 | Gendler | 705/7 |
| 7,685,604 B2 | 3/2010 | Baartman et al. | |
| 7,716,073 B1 | 5/2010 | Martin | |
| 7,849,438 B1 | 12/2010 | Hemmat et al. | |
| 7,865,867 B2* | 1/2011 | Keene Potter et al. | 717/101 |
| 7,930,201 B1 | 4/2011 | Issa et al. | |
| 2002/0026630 A1 | 2/2002 | Schmidt et al. | |
| 2002/0032596 A1* | 3/2002 | Ohsaki et al. | 705/9 |
| 2002/0042731 A1* | 4/2002 | King et al. | 705/10 |
| 2002/0046394 A1 | 4/2002 | Do et al. | |
| 2002/0049816 A1 | 4/2002 | Costin, IV et al. | |
| 2002/0059512 A1 | 5/2002 | Desjardins et al. | |
| 2002/0087381 A1 | 7/2002 | Freeman et al. | |
| 2002/0147801 A1* | 10/2002 | Gullotta et al. | 709/223 |
| 2003/0018952 A1 | 1/2003 | Roetzheim | |
| 2003/0023675 A1* | 1/2003 | Ouchi et al. | 709/203 |
| 2003/0033191 A1 | 2/2003 | Davies et al. | |
| 2003/0050812 A1* | 3/2003 | Clark et al. | 705/7 |
| 2003/0055811 A1 | 3/2003 | Stork et al. | |
| 2003/0061266 A1* | 3/2003 | Ouchi | 709/106 |
| 2003/0110067 A1* | 6/2003 | Miller et al. | 705/8 |
| 2003/0145124 A1 | 7/2003 | Guyan et al. | |
| 2003/0171970 A1 | 9/2003 | Kinsella | |
| 2003/0181991 A1 | 9/2003 | Chau et al. | |
| 2004/0002883 A1 | 1/2004 | Andrews et al. | |
| 2004/0030421 A1 | 2/2004 | Haley | |
| 2004/0039629 A1 | 2/2004 | Hoffman et al. | |
| 2004/0098154 A1 | 5/2004 | McCarthy | |
| 2004/0111430 A1* | 6/2004 | Hertling et al. | 707/104.1 |
| 2004/0143477 A1 | 7/2004 | Wolff | |
| 2004/0143811 A1* | 7/2004 | Kaelicke et al. | 717/101 |
| 2004/0148183 A1 | 7/2004 | Sadiq | |
| 2004/0162741 A1* | 8/2004 | Flaxer et al. | 705/7 |
| 2004/0172445 A1* | 9/2004 | Singh et al. | 709/200 |
| 2004/0215544 A1 | 10/2004 | Formale et al. | |
| 2005/0004825 A1 | 1/2005 | Ehrler et al. | |
| 2005/0027585 A1* | 2/2005 | Wodtke et al. | 705/9 |
| 2005/0027733 A1 | 2/2005 | Donahue | |
| 2005/0114829 A1 | 5/2005 | Robin et al. | |
| 2005/0137920 A1 | 6/2005 | O'Connor et al. | |
| 2006/0031078 A1 | 2/2006 | Pizzinger et al. | |
| 2006/0047555 A1* | 3/2006 | Kang et al. | 705/9 |
| 2006/0059423 A1 | 3/2006 | Lehmann et al. | |
| 2006/0106627 A1 | 5/2006 | Al-Nujaidi | |
| 2006/0173908 A1 | 8/2006 | Browning et al. | |
| 2006/0235732 A1 | 10/2006 | Miller et al. | |
| 2007/0179790 A1* | 8/2007 | Leitch et al. | 705/1 |
| 2007/0276674 A1 | 11/2007 | Hemmat | |
| 2008/0319816 A1 | 12/2008 | Benny et al. | |
| 2009/0320088 A1* | 12/2009 | Gill et al. | 726/1 |

OTHER PUBLICATIONS

Russ, Melissa L., and McGregor, John D., A Software Development Process for Small Projects (Sep./Oct. 2000) IEEE Software, vol. 17, No. 5, pp. 96-101.*

Office Action dated Dec. 1, 2005, 16 pages, U.S. Appl. No. 10/429,615, filed May 5, 2003.

Final Office Action dated Apr. 18, 2006, 15 pages, U.S. Appl. No. 10/429,615, filed May 5, 2003.

Office Action dated Jan. 4, 2007, 14 pages, U.S. Appl. No. 10/429,615, filed May 5, 2003.

Final Office Action dated Sep. 10, 2007, 22 pages, U.S. Appl. No. 10/429,615, filed May 5, 2003.

Hemmat, Merzad, Filing Date—May 5, 2003, U.S. Appl. No. 10/429,615, Specification (33 pgs.), Drawings (3 sheets).

Hemmat, Merzad, Filing Date—Aug. 18, 2003, U.S. Appl. No. 10/643,334, Specification (29 pgs.), Drawings (4 sheets).

Department of Defense , Systems Management College, Systems Engineering Fundamentals, Jan. 2001, Defencse Acquisition University Press, pp. 1-222.

Final Office Action dated Dec. 22, 2009, 31 pages, U.S. Appl. No. 10/643,334, filed Aug. 18, 2003.

Office Action dated Jan. 7, 2010, 42 pages, U.S. Appl. No. 10/643,417, filed Aug. 19, 2003.

Final Office Action dated Feb. 24, 2010, 27 pages, U.S. Appl. No. 11/120,224, filed May 2, 2005.

Advisory Action dated Mar. 12, 2010, 8 pages, U.S. Appl. No. 10/643,334, filed Aug. 18, 2003.

Final Office Action dated Mar. 30, 2010, 48 pages, U.S. Appl. No. 11/226,121, filed Sep. 14, 2005.

Final Office Action dated Apr. 13, 2010, 49 pages, U.S. Appl. No. 10/643,418.

Advisory Action dated May 4, 2010, 3 pages, U.S. Appl. No. 11/120,224, filed May 2, 2005.

"Enterprise Resource Planning (EPR) Project," University of Florida, Jan. 2003, pp. 1-25, www.bridges.ufl.edu/implementation/teams/processes/EPR-Project-Work-Policies-draft-v6.pdf.

Hemmat, et al., Provisional Patent Application entitled, "Enterprise Architecture Development Process," filed Aug. 19, 2002, U.S. Appl. No. 60/404,824.

Hemmat, Merzad, et al., Patent Application entitled, "Integrated Advance Scheduling of Indeterminate Projects in an Integrated Development Process," filed Dec. 8, 2003, U.S. Appl. No. 10/730,601.

Issa, Philip, et al., Patent Application entitled, "EDP Portal Cross-Process Integrated View," filed Aug. 19, 2003, U.S. Appl. No. 10/643,417.

Brandes, Tracy, et al., Patent Application entitled, "Change Request Processing in an Enterprise Development Proces," filed Aug. 19, 2003, U.S. Appl. No. 10/643,418.

Issa, Philip, et al., Patent Application entitled, "Integrated Software Implementation of Enterprise Development Process," filed Aug. 19, 2003, U.S. Appl. No. 10/643,419.

Hemmat , Merzad, et al., Patent Application entitled, "Enterprise Software Development Process for Outsourced Developers," filed May 27, 2004, U.S. Appl. No. 10/857,287.

Hindman, Leslie Shannon, et al., Patent Application entitled, "Tool and Method for Work Authorization in an Outsourced EDP Process," filed May 2, 2005, U.S. Appl. No. 11/120,224.

Higgins, Gregory, et al., Patent Application entitled, "Multiple Conditional Pipeline Process Architecture," filed Sep. 14, 2005, U.S. Appl. No. 11/226,121.

Hemmat, Merzad, et al., Patent Application entitled, "Streamlined discover-Design Initiative," filed Jan. 19, 2005, U.S. Appl. No. 11/038,598.

Arredondo, Barbara, et al., Patent Application entitled, "System and Method for Managing Enterprise Services Projects," filed Oct. 12, 2005, U.S. Appl. No. 11/248,342.

Bray Curtis A., et al., Patent Application entitled, "Technology Assessment and Selection in Enterprise Development Process," filed Aug. 26, 2005, U.S. Appl. No. 11/213,239.

Notice of Panel Decision dated Oct. 13, 2009 14 pages, U.S. Appl. No. 10/429,615, filed May 5, 2003.

Office Action dated Dec. 27, 2007, 14 pages, U.S. Appl. No. 10/643,334, filed Aug. 18, 2003.

Office Action (Restriction) dated Sep. 15, 2008, 7 pages, U.S. Appl. No. 10/643,334, filed Aug. 18, 2003.

Final Office Action dated Mar. 23, 2009, 19 pages, U.S. Appl. No. 10/643,334, filed Aug. 18, 2003.

Office Action (Restriction) dated Jul. 20, 2009, 6 pages, U.S. Appl. No. 10/643,334, filed Aug. 18, 2003.

Office Action dated Mar. 30, 2007, 16 pages, U.S. Appl. No. 10/730,601, filed Dec. 8, 2003.

Final Office Action dated Sep. 20, 2007, 15 pages, U.S. Appl. No. 10/730,601, filed Dec. 8, 2003.

Advisory Action dated Dec. 27, 2007, 3 pages, U.S. Appl. No. 10/730,601, filed Dec. 8, 2003.

Office Action dated Apr. 29, 2008, 18 pages, U.S. Appl. No. 10/730,601, filed Dec. 8, 2003.

Final Office Action dated Oct. 28, 2008, 16 pages, U.S. Appl. No. 10/730,601, filed Dec. 8, 2003.

Notice of Allowance dated Mar. 13, 2009, 12 pages, U.S. Appl. No. 10/730,601, filed Dec. 8, 2003.

Office Action dated Jan. 22, 2008, 9 pages, U.S. Appl. No. 10/643,417, filed Aug. 19, 2003.

Office Action dated Apr. 2, 2008, 17 pages, U.S. Appl. No. 10/643,417, filed Aug. 19, 2003.

Final Office Action dated Oct. 17, 2008, 19 pages, U.S. Appl. No. 10/643,417, filed Aug. 19, 2003.

Advisory Action dated Jan. 26, 2009, 3 pages, U.S. Appl. No. 10/643,417, filed Aug. 19, 2003.

Office Action dated May 27, 2009, 22 pages, U.S. Appl. No. 10/643,417, filed Aug. 19, 2003.

Office Action dated Sep. 23, 2008, 13 pages, U.S. Appl. No. 10/643,418.

Final Office Action dated Apr. 1, 2009, 14 pages, U.S. Appl. No. 10/643,418.

Advisory Action dated Jul. 7, 2009, 3 pages, U.S. Appl. No. 10/643,418.

Office Action dated Feb. 21, 2007, 22 pages, U.S. Appl. No. 10/643,419, filed Aug. 19, 2003.

Final Office Action dated Aug. 1, 2007, 25 pages, U.S. Appl. No. 10/643,419, filed Aug. 19, 2003.

Advisory Action dated Nov. 13, 2007, 7 pages, U.S. Appl. No. 10/643,419, filed Aug. 19, 2003.

Notice of Abandonment dated Mar. 17, 2008, 2 pages, U.S. Appl. No. 10/643,419, filed Aug. 19, 2003.

Office Action dated Apr. 10, 2009, 22 pages, U.S. Appl. No. 10/857,287, filed May 27, 2004.

Final Office Action dated Sep. 15, 2009, 8 pages, U.S. Appl. No. 10/857,287, filed May 27, 2004.

Office Action dated Aug. 17, 2009, 26 pages, U.S. Appl. No. 11/120,224, filed May 2, 2005.

Office Action dated Aug. 4, 2009, 22 pages, U.S. Appl. No. 11/226,121, filed Sep. 14, 2005.

Office Action dated Aug. 3, 2009, 28 pages, U.S. Appl. No. 11/038,598, filed Jan. 19, 2005.

Office Action dated Aug. 18, 2008, 25 pages, U.S. Appl. No. 11/248,342, filed Oct. 12, 2005.

Office Action dated Feb. 19, 2009, 22 pages, U.S. Appl. No. 11/248,342, filed Oct. 12, 2005.

Final Office Action dated Sep. 3, 2009, 19 pages, U.S. Appl. No. 11/248,342, filed Oct. 12, 2005.

Office Action dated Apr. 30, 2009, 21 pages, U.S. Appl. No. 11/213,239 filed Aug. 12, 2005.

Final Office Action dated Oct. 26, 2009, 30 pages, U.S. Appl. No. 11/213,239 filed Aug. 12, 2005.

Office Action dated Oct. 27, 2009, 15 pages, U.S. Appl. No. 10/643,418.

Advisory Action dated Nov. 17, 2009, 17 pages, U.S. Appl. No. 11/248,342, filed Oct. 12, 2005.

Advisory Action dated Dec. 8, 2009, 2 pages, U.S. Appl. No. 10/857,287, filed May 27, 2004.

Office Action dated Feb. 1, 2011, U.S. Appl. No. 11/038,598, filed Jan. 19, 2005.

Pyron, Tim, "Sams Teach Yourself Microsoft® Project 2000 in 24 Hours," Safari Books Online, May 4, 2000, http://proquest.safaribooksonline.com/0-672-31814-8, 6 pages.

Office Action dated Jun. 24, 2010, 45 pages, U.S. Appl. No. 10/643,417, filed Aug. 19, 2003.

Office Action dated Jul. 1, 2010, 37 pages, U.S. Appl. No. 11/120,224, filed May 2, 2005.

Notice of Allowance dated Dec. 15, 2010, U.S. Appl. No. 10/643,417, filed Aug. 19, 2003.

Final Office Action dated Nov. 22, 2010, U.S. Appl. No. 11/120,224, filed May 2, 2005.

Babar, Muhammad Ali, et al., "An Industrial Case of Exploiting Product Line Architectures in Agile Software Development," ACM SPLC, 2009, pp. 171-179.

Dossani, Rafiq, et al., "The Internet's Role in Offshored Services: A Case Study of India," ACM Transactions on Internet Technology, vol. 7, No. 3, Article 15, Publication date Aug. 2007, 21 pages.

Unphon, Hataichanok, "Making Use of Architecture Throughout the Software Life Cycle—How the Build Hierarchy can Facilitate Product Line Development," IEEE SHARK, May 2009, pp. 41-48.

Yalaho, Anicet, et al., "A Conceptual Process Framework for IT-Supported International Outsourcing of Software Production," Department of Computer Science and Information Systems, 2005, pp. 1-10.

Advisory Action dated Jul. 21, 2010, 11 pages, U.S. Appl. No. 10/643,418.

Notice of Allowance dated Jul. 16, 2010, 26 pages, U.S. Appl. No. 10/857,287, filed May 27, 2004.

Advisory Action dated Aug. 31, 2010, 3 pages, U.S. Appl. No. 11/038,598, filed Jan. 19, 2005.

Examiner's Answer dated May 12, 2011, U.S. Appl. No. 11/120,224, filed May 2, 2005.

Examiner's Answer dated Jun. 8, 2010, 21 pages, U.S. Appl. No. 11/248,342, filed Oct. 12, 2005.

Final Office Action dated Jun. 16, 2010, 58 pages, U.S. Appl. No. 11/038,598, filed Jan. 19, 2005.

Decision on Appeal dated Apr. 25, 2012, U.S. Appl. No. 11/248,342, filed Oct. 12, 2005.

Office Action dated Oct. 2, 2012, U.S. Appl. No. 10/643,334, filed Aug. 18, 2003.

Office Action dated Feb. 3, 2010, 43 pages, U.S. Appl. No. 10/857,287, filed May 27, 2004.

* cited by examiner

| Criterion Group ID | Criterion Group Description |
|---|---|
| 1 | SE Path 1 |
| 2 | SE Path 2 |
| 3 | SE Path 3 |
| 4 | SE Path 4 |
| 5 | SE Path 5 (Contract) |
| 6 | SE Path 5 (Pre-Contract) |
| 10 | SE Submit to Sponsor Review |
| 11 | SE Submit to IT Review |
| 12 | SE Submit to IT Review (Ontrack) |
| 13 | SE Submit to Technical Assessment |
| 14 | SE Submit to Estimation LOE |
| 15 | SE Submit to Define Approval |
| 16 | SE Submit to Discover Approval |
| 17 | SE Submit to IT Discover Review |
| 18 | SE Submit to User Acceptance |
| 19 | SE Submit to Warranty |
| 20 | SE Submit to Discover Planning (include Approve Project at Define and Path 3) |
| 21 | SE Submit to Design (include Approve Project at Discover, Path 1, Path 2) |
| 22 | SE Submit to IT Define Review |

Figure 8

| Criterion ID Number (810) | Criterion Group ID (820) | Flag (830) |
|---|---|---|
| 1 | 1 | Y |
| 2 | 1 | Y |
| 3 | 1 | Y |
| 5 | 1 | Y |
| 6 | 1 | Y |
| 7 | 1 | Y |
| 8 | 1 | Y |
| 9 | 1 | Y |
| 10 | 1 | Y |
| 11 | 1 | Y |
| 12 | 1 | Y |
| 13 | 1 | Y |
| 14 | 1 | Y |
| 15 | 1 | Y |
| 16 | 1 | Y |
| 17 | 1 | Y |
| 18 | 1 | Y |
| 19 | 1 | Y |
| 20 | 1 | Y |
| 21 | 1 | Y |
| 22 | 1 | Y |
| 23 | 1 | Y |
| 24 | 1 | Y |
| 25 | 1 | Y |
| 26 | 1 | Y |
| 27 | 1 | Y |
| 28 | 1 | Y |
| 29 | 1 | Y |
| 30 | 1 | Y |
| 31 | 1 | Y |
| 32 | 1 | Y |
| 73 | 1 | Y |

Figure 9a

| Criterion ID Number | Criterion Group ID | Flag |
|---|---|---|
| 3 | 3 | Y |
| 4 | 3 | Y |
| 5 | 3 | Y |
| 7 | 3 | Y |
| 8 | 3 | Y |
| 10 | 3 | Y |
| 12 | 3 | Y |
| 13 | 3 | Y |
| 17 | 3 | Y |
| 20 | 3 | Y |
| 21 | 3 | Y |
| 22 | 3 | Y |
| 23 | 3 | Y |
| 24 | 3 | Y |
| 25 | 3 | Y |
| 28 | 3 | Y |
| 32 | 3 | Y |
| 37 | 3 | Y |
| 73 | 3 | Y |
| 33 | 4 | Y |
| 34 | 4 | Y |
| 35 | 4 | Y |
| 7 | 5 | Y |
| 8 | 5 | Y |
| 10 | 5 | Y |
| 12 | 5 | Y |
| 13 | 5 | Y |
| 17 | 5 | Y |
| 20 | 5 | Y |
| 21 | 5 | Y |
| 22 | 5 | Y |
| 23 | 5 | Y |
| 24 | 5 | Y |
| 25 | 5 | Y |
| 28 | 5 | Y |
| 32 | 5 | Y |
| 37 | 5 | Y |

Figure 9c

| Criterion ID Number (810) | Criterion Group ID (820) | Flag (830) |
|---|---|---|
| 7 | 6 | Y |
| 8 | 6 | Y |
| 10 | 6 | Y |
| 12 | 6 | Y |
| 13 | 6 | Y |
| 17 | 6 | Y |
| 20 | 6 | Y |
| 21 | 6 | Y |
| 22 | 6 | Y |
| 23 | 6 | Y |
| 24 | 6 | Y |
| 25 | 6 | Y |
| 28 | 6 | Y |
| 32 | 6 | Y |
| 37 | 6 | Y |
| 38 | 10 | Y |
| 39 | 10 | Y |
| 40 | 10 | Y |
| 41 | 10 | Y |
| 42 | 10 | Y |
| 43 | 10 | Y |
| 46 | 10 | Y |
| 47 | 10 | Y |
| 38 | 11 | Y |
| 39 | 11 | Y |
| 40 | 11 | Y |
| 41 | 11 | Y |
| 42 | 11 | Y |
| 43 | 11 | Y |
| 44 | 11 | Y |
| 45 | 11 | Y |
| 46 | 11 | Y |
| 47 | 11 | Y |
| 48 | 11 | Y |
| 72 | 11 | Y |
| 49 | 12 | Y |
| 51 | 12 | Y |
| 69 | 12 | Y |
| 45 | 13 | Y |
| 52 | 13 | Y |
| 53 | 13 | Y |

Figure 9d

| | Criterion ID Number (810) | Criterion Group ID (820) | Flag (830) |
|---|---|---|---|
| 858 | 55 | 14 | Y |
| | 56 | 14 | Y |
| | 57 | 14 | Y |
| | 58 | 14 | Y |
| 860 | 59 | 15 | Y |
| | 63 | 15 | Y |
| | 64 | 15 | Y |
| | 65 | 15 | Y |
| | 71 | 15 | Y |
| 862 | 60 | 16 | Y |
| | 61 | 16 | Y |
| | 62 | 16 | Y |
| 864 | 67 | 17 | Y |
| 866 | 60 | 18 | Y |
| | 67 | 18 | Y |
| 868 | 68 | 19 | Y |
| 870 | 50 | 20 | Y |
| 872 | 50 | 21 | Y |
| 874 | 74 | 22 | Y |

| Criterion ID Number | Criterion Description |
|---|---|
| 1 | Preauthorized Spending Limit is between 1 and 300 hours |
| 2 | This project can be accomplished within the preauthorized spending limit |
| 3 | Project is planned to be part of a Standalone Release |
| 4 | IT is willing to commit to Delivery Date and LOE as contract |
| 5 | Project does not require ITM Support for Test Planning/Execution |
| 6 | Project impacts a single application, not including Production/Data Management |
| 7 | Project impacts a single outsource supplier impact |
| 8 | Project does not introduce a new application or system |
| 9 | Project does not add new subscribers to corporate services |
| 10 | Project does not add more than 100 subscribers to corporate services |
| 11 | Project does not add new internal users to corporate applications |
| 12 | Project does not add more than 100 internal users to corporate applications |
| 13 | Project does add/build out a new Retail Store or Call Center |
| 14 | Project does not involve the addition of new Mainframe or Distributed Storage |
| 15 | Project does not involve the addition of new Direct Attached Storage (SAN or NAS) |
| 16 | Project does not involve the replacement of existing corporate desktops |
| 17 | Project does not involve the replacement of more than 10 corporate desktops |
| 18 | Project does not change an established Availability SLA for a corporate application |
| 19 | Project does not change the # of users accessing app during SLA availability hours |
| 20 | Project does not have any impact to Regulatory Fees |
| 21 | Project does not involve changes to corporate network routers |
| 22 | Project does not involve changes to corporate network routing tables |
| 23 | Project does not involve changes to corporate network switches |
| 24 | Project does not involve changes to corporate network content delivery switches |
| 25 | Project does not involve changes to corporate network firewalls |

Figure 10a

| Criterion ID Number | Criterion Description |
|---|---|
| 26 | Project does not involve the installation of redeployed Data Center Equipment, besides storage, SAN, or NAS |
| 27 | Project does not involve the relocation of DC equipment (servers, mainframe storage, distributed storage, SAN or NAS) within the same Data Center |
| 28 | Project does not involve the procurement or installation of DC equipment, besides storage, SAN, or NAS |
| 29 | Project does not involve the removal of Data Center equipment |
| 30 | Project does not involve the enhancement to or creation of a citrix application |
| 31 | Project does not involve the enhancement to or creation of a desktop application |
| 32 | Project does not involve a change to Wireless Contact Center Functionality |
| 33 | Sponsor has agreed to bypass Discover approval if project cost/schedule does not exceed values initial target values provided at the end of Define |
| 34 | The total Contract LOE does not exceed the Estimation LOE plus 10% Estimation LOE |
| 35 | The Contract Delivery Date is on or before the Initial Target Delivery Date |
| 36 | Total IT impact does not exceed 300 hours |
| 37 | Total IT impact does not exceed 2000 hours |
| 38 | A SME is assigned to this project |
| 39 | A Sponsoring Director is assigned to this project |
| 40 | A Sponsoring VP is assigned to this project |
| 41 | A Description has been entered for this project |
| 42 | A Business Justification has been entered for this project |
| 43 | Business Requirements have been entered for this project |
| 44 | A Business Project Manager (BPM) has been assigned to this project |
| 45 | A primary impacted application has been identified for the project |
| 46 | The Project Request Sponsor Questionnaire has been completed |
| 47 | A Requested Delivery Date has been provided for this project |
| 48 | A primary funding Service Request (SR) has been identified for this project |
| 49 | An SR has been established in Ontrack for this project |

Figure 10b

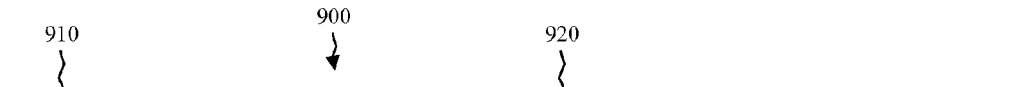

| Criterion ID Number | Criterion Description |
|---|---|
| 50 | The Parent SR/Service Request Number for this project is in OPN Fiscal Status |
| 51 | The Sponsoring Org Id for this project matches the Sponsoring Org ID for this SR in Ontrack |
| 52 | An Application Architect is assigned to this project |
| 53 | An IT Project Manager (IT PM) is assigned to this project |
| 55 | An Approach Description has been entered for this project |
| 56 | Technical Assessment Additional Information section have all been answered |
| 57 | Technical Assessment Potential Application Impact section have all been answered |
| 58 | Technical Assessment Data Management Impact section have all been answered |
| 59 | IT Define Signoff has been provided |
| 60 | This project has been committed to a release |
| 61 | IT Discover Signoff has been provided |
| 62 | A Contract Delivery Date has been provided for this project |
| 63 | A Target Delivery Date has been provided for this project |
| 64 | A Target Release has been identified for this project |
| 65 | A Level of Commitment has been provided for this project |
| 66 | This project has been aligned with a corporate initiative, or it has been explicitly indicated that the project is not aligned with a corporate initiative |
| 67 | This project has no open/pending change requests |
| 68 | IT Deploy Signoff has been provided |
| 69 | Either the Primary or Feasibility SR for this project is in OPN Fiscal Status |
| 70 | Estimation LOE does not exceed pre-authorized spending limit |
| 71 | Release has to stay in committed status if user selects yes in the level of commitment |
| 72 | Preauthorized Spending Limit is between 0 and 300 hours |
| 73 | Project does not need any hardware expenditure |
| 74 | The total impact for this project must be greater than "0" hours. A project is not allowed to be submitted from Estimation LOE if the total LOE hours="0". |

Figure 10c

SMALL ENHANCEMENT PROCESS WORKFLOW MANAGER

CROSS-REFERENCE TO RELATED APPLICATIONS

This application contains subject matter related to U.S. patent application Ser. No. 10/429,615, filed May 5, 2003 and entitled "Defining and Sizing Feasible Approaches to Business Needs Within an Integrated Development Process", and to U.S. patent application Ser. No. 10/643,334, filed Aug. 18, 2003 and entitled "Method For Discovering Functional and System Requirements in an Integrated Development Process", both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of small development projects. More particularly, embodiments of the present invention provide a system and method for efficiently managing the workflow in small software development projects.

BACKGROUND OF THE INVENTION

An enterprise might follow a consistent set of steps in large-scale development projects, such as software development projects. Consistency can facilitate the integration of enterprise architecture and provide rigor to the process of enterprise-wide software development. Consistent checkpoints throughout the process can allow significant events to occur in a predictable, scheduled manner. However, consistency can also lead to undue rigidity. Inefficiency can result when steps that are not necessary for a project are followed simply because they are called for in an inflexible enterprise development process.

SUMMARY OF THE INVENTION

An embodiment of the invention is a computer-implemented system for selecting a workflow path of a project. The system consists of an initial phase of the project, an evaluation phase of the project, a completion phase of the project, and a criteria engine. The evaluation phase includes a plurality of workflow paths for the project based on criteria of the project. The criteria engine can select one of the plurality of workflow paths for the project based on the project criteria.

An alternative embodiment provides a development process for a small project. The process includes an initial phase consisting of a project staging step, a sponsor review step, and an IT review step. The process includes an evaluation phase including a technical assessment step, an estimation LOE step, an IT define review step, a define approval step, a discover planning step, a requirements modeling step, a contract LOE step, an IT discover review step, a discover approval step, and a design step. The process provides a completion phase consisting of a develop step, a user acceptance step, a deploy step, a warranty step, and a complete step. The process also includes a selection component operable to select one of a plurality of paths in the evaluation phase based on a plurality of project specifications. Each of the plurality of paths include one or more of the steps of the evaluation phase. At least one of the projects specifications include that the project is in a range of about 2,000 or fewer hours and not impacting more than one enterprise application.

Another alternative embodiment is a method for managing the progress of a project through a development process. The method includes selecting, based on at least one criterion of the project, which of a plurality of steps in the development process will be performed. The plurality of steps includes a technical assessment step, an estimation LOE step, an IT define review step, a define approval step, a discover planning step, a requirements modeling step, a contract LOE step, an IT discover review step, a discover approval step, and a design step.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 8 is a table of criterion group IDs and criterion group descriptions.

FIGS. 9a-9e are tables of criterion ID numbers, criterion group IDs, and flags.

FIGS. 10a-10c are tables of criterion ID numbers and criterion descriptions.

DETAILED DESCRIPTION OF THE PREFERRED EMBODIMENTS

Figure 1:
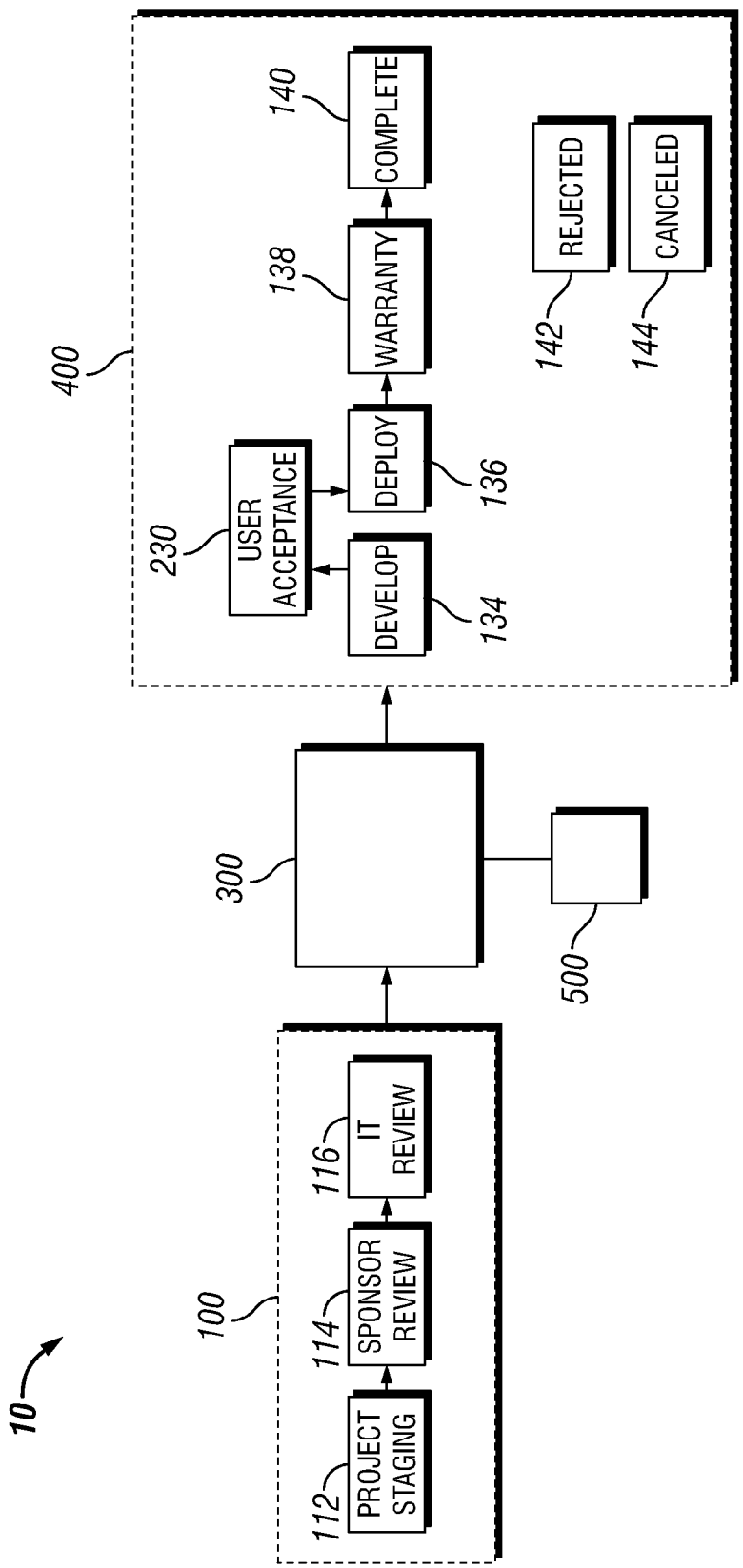
FIG. 1 is a block diagram of a general development process according to an embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Development projects, such as software development projects, can have a broad range of scales. Some projects can require thousands of hours of development time and can involve a complicated series of phases, steps, and sub-steps. The size and complexity of such projects typically dictate that a certain amount of rigor be enforced in the development process. An enterprise development process employing a consistent series of steps might be followed to ensure quality and consistency in such projects.

Other projects may be relatively straightforward, having easily achieved objectives and requiring only tens or hundreds of hours of effort. A rigorous, inflexible enterprise development process may not be appropriate for such small-scale projects. For example, a large-scale enterprise development process might call for numerous meetings, planning and strategy sessions, requirement projections, and other steps that might not be necessary for a small-scale project.

The present disclosure, according to one embodiment, provides a system and method for efficiently managing the workflow of small-scale projects. Projects that meet certain criteria can follow a flexible, small-scale development process rather than a more rigid and complicated enterprise development process. The small-scale process will be referred to herein as the small enhancement process.

In an embodiment of the small enhancement process, a business-related group within an enterprise requests that a project, such as a software development project, be performed. The business-related group will be referred to herein as a sponsor. A separate group assesses the project request and gives the sponsor one or more estimates of the amount of time and other resources that might be needed to complete the project. Another group might perform the requested work or a single group might provide the estimates and perform the work. In the case of a software development project, both the requirements assessment and the actual work might be performed by an information technology (IT) group.

The IT group can provide its estimates at several points in the assessment process and the sponsor can give approval at those points for further steps in the small enhancement process to take place. The sponsor also has the capability to pre-approve the bypassing of certain steps in the small enhancement process. If the IT group states that it can meet certain estimates without performing certain analysis steps, and if the sponsor has pre-approved bypassing those steps when the IT group says those steps are unnecessary, those steps can be bypassed. When the sponsor pre-approves a bypass, it can be assumed that the sponsor will provide funding for the step that occurs after the bypassed steps.

The size of a project is one criterion that might determine whether steps can be bypassed. Small enhancement projects can be divided into two groups based on project size, where size can be measured in the number of hours of effort a project is estimated to require. A project that is expected to need fewer than a certain number of hours might be considered small, while a project that is expected to need significantly fewer hours than a small project might be considered ultra-small.

For example, an ultra-small project might be estimated to need 300 hours or less, while a small project might be estimated to need more than 300 hours but less than 2000 hours. Projects requiring 2000 or more hours of effort might be considered large-scale projects that are ineligible for the small, enhancement process. In various embodiments, various other thresholds can be used for ultra-small projects, small projects, and large-scale projects.

Also, a group within an enterprise might have project size thresholds that differ from those of the enterprise in general. For example, a corporation might set the upper limit for ultra-small projects at 300 hours. A business group within the corporation might specify that the projects it sponsors can be considered ultra-small only if the projects require less than 200 hours. A group would typically not be allowed to designate thresholds greater than those set by the enterprise as a whole.

FIG. 1 illustrates an embodiment of a small enhancement process 10. The process 10 consists of an initial phase 100, an evaluation phase 300, and a completion phase 400. The initial phase 100 and the completion phase 400 typically remain substantially the same for every project, while the evaluation phase 300 varies based on the criteria and specifications of each project.

The initial phase 100 consists of a project staging step 112, a sponsor review step 114, and an IT review step 116. In the project staging step 112, the sponsor can create and edit a project request before the request is submitted to the IT group. In the sponsor review step 114, the sponsor can review the request and associate the project with a funding source. The sponsor might also assign a business project manager to manage the business side of the project. The business project manager might assign a project manager who will have direct responsibility for future business-related steps in the project. The sponsor can then send the request to the IT review step 116. In the IT review step 116, a representative of the IT group reviews the project and assigns an IT project manager and an architect.

The completion phase 400 consists of a develop step 134, a user acceptance step 230, a deploy step 136, a warranty step 138, and a complete step 140. In the develop step 134, in the case of a software development project, the IT group develops processes that create and test application systems and programming code according to the specifications detailed in the evaluation phase 300.

The user acceptance step 230 is a review and approval process performed by the sponsor. The sponsor reviews the progress of a project up to and including the develop step 134 and can approve the project to continue to the deploy step 136 and subsequent steps.

The deploy step 136 involves processes for planning and implementing the activities required to migrate program code from the development environment to the production environment. The deploy step 136 defines the planning, execution, and verification activities required for migration from the development environment to the production (operational) environment. A sign-off might be required in the deploy step 136 to allow a project to move into the production environment. Emails might be automatically sent to the appropriate parties stating that approval is needed for the project to move into production.

The warranty step 138 refers to the activities required during the transition period between deployment and on-going maintenance to ensure successful deployment. If a problem is identified in the warranty period, it is analyzed, isolated, and repaired. The repair is then verified and user acceptance is gained. The project can then be turned over to a production support group for ongoing maintenance and the project can be closed out. During warranty 138, the IT group typically commits to repairing any problems without requesting additional funds. The warranty 138 period might last approximately two to four weeks, after which a project might move to the complete step 140.

Details about an exemplary enterprise development process (EDP) as well as the develop step 134, the deploy step 136, and the warranty step 138 can be found in U.S. patent application Ser. No. 10/429,615, filed May 5, 2003 and entitled "Defining and Sizing Feasible Approaches to Business Needs Within an Integrated Development Process", and in U.S. patent application Ser. No. 10/643,334, filed Aug. 18, 2003 and entitled "Method For Discovering Functional and System Requirements in an Integrated Development Process", both of which are incorporated herein by reference.

If all of the steps in a project are completed successfully, the project can move to the complete step 140. If the sponsor rejects or cancels a project or if all of the steps in a project are not completed successfully, the project might be placed in a rejected queue 142 or a canceled queue 144.

In an embodiment of the small enhancement process 10, multiple steps are present within the evaluation phase 300, some of which can be bypassed based on the criteria and specifications of a project. Project criteria and specifications are passed to a criteria engine 500, which then determines a path within the evaluation phase 300 that the project will follow. The project specifications might be obtained through a questionnaire that solicits information about various parameters of the project. The criteria engine 500 can evaluate the responses to the questionnaire, compare the responses to a standard set of project criteria, and determine if any steps in the evaluation phase 300 can be bypassed. Details of the operation of the criteria engine 500 are provided below.

Figure 2:
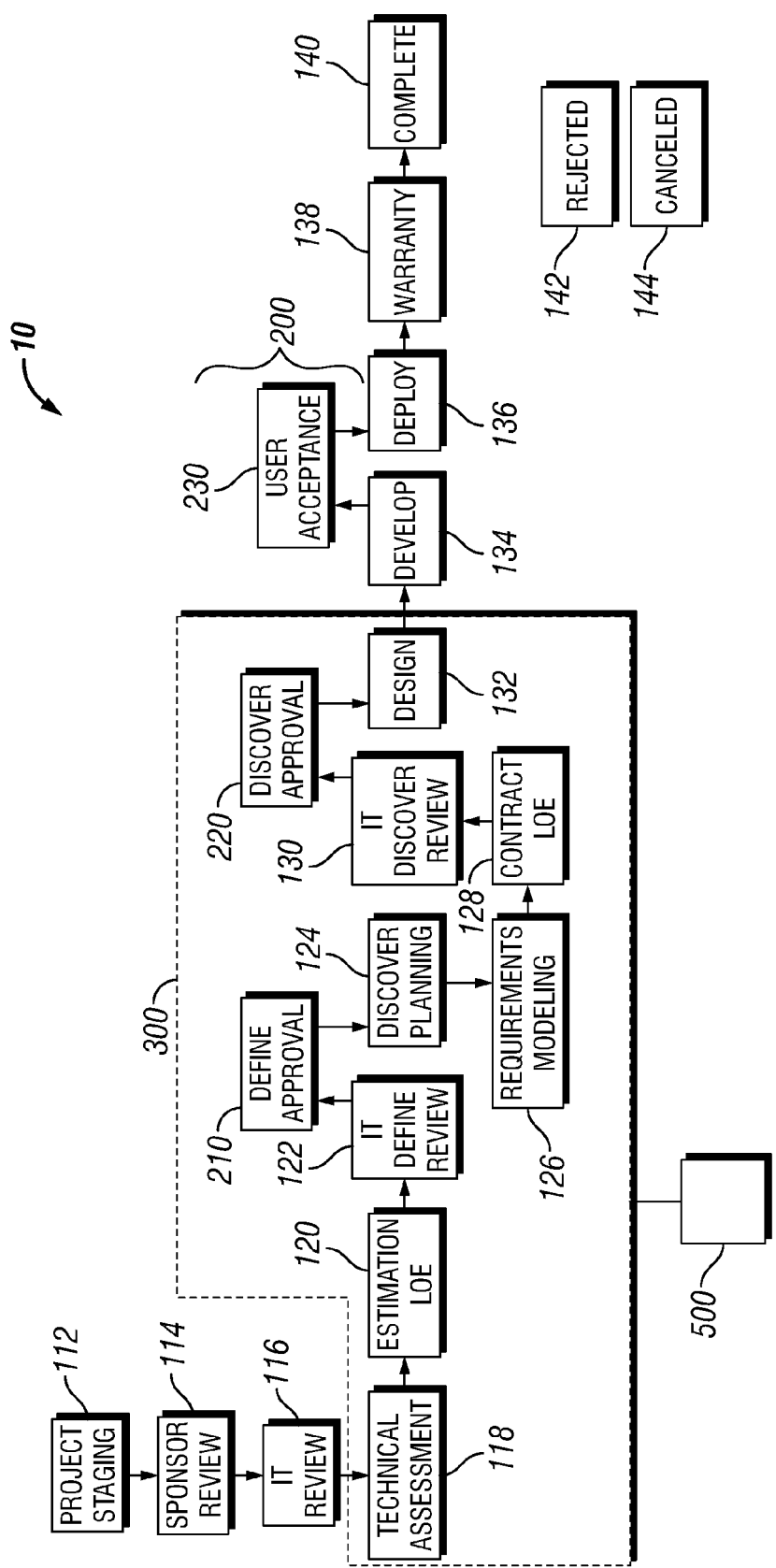
FIG. 2 is a block diagram illustrating one path of the development process according to an embodiment of the present disclosure.

FIG. 2 illustrates an embodiment of a small enhancement process 10 in which all of the steps in the evaluation phase 300 are followed. The evaluation phase 300 begins with a technical assessment 118 of a project by the IT group. In the technical assessment 118, an architect reviews the project to determine the scope of what is being requested. The architect may also determine the hardware needed to complete the project. The technical assessment 118 might be guided by a questionnaire that the architect completes to specify the technical requirements for the project. This questionnaire may be the same as, or a portion of, the previously mentioned questionnaire used to solicit the project specifications.

After the completion of the technical assessment 118, emails or other forms of notification might automatically be sent to the appropriate parties stating that the small enhancement process 10 is ready to move to another step. The notifications might request that the appropriate parties within the IT group be assigned who will later be responsible for signing off on further steps in the small enhancement process 10.

From the technical assessment 118, the project can move to an estimation level of effort (LOE) step 120. In estimation LOE 120, the IT group produces an estimate of the number of hours that will be required to complete the project. The IT architect assigned to the project might identify which applications will be impacted by the project. Emails might be automatically sent to representatives of the impacted applications asking how much time will be spent on the project by each of the applications. The LOEs for each application can be added to derive a total LOE for the entire project.

From the estimation LOE 120, the project can move to an IT define review step 122. In IT define review 122, the project and the LOEs are reviewed to verify that the LOEs are appropriate for the project. The review can be done by an IT project manager, a solutions architect, an LOE validator, and/or some other role within the IT group that has an understanding of the large-scale enterprise architecture. If the LOEs appear legitimate, the reviewer can provide a sign-off on the estimates.

If the IT group signs off on the LOEs, the project can move to a define approval step 210, where the sponsor reviews the LOEs. If the sponsor signs off on the LOEs and approves the project to continue through the small enhancement process 10, the project can move to a second set of estimates that can be referred to as discovery.

The first set of estimates, those created and reviewed in technical assessment 118, estimation LOE 120, and IT define review 122, might be returned very quickly from the IT group to the sponsor, typically within about ten business days. This short turnaround might not provide enough time to do a thorough analysis. For a larger or more complex small enhancement project, a more detailed analysis may be needed. In that case, the IT group might undertake the second, discovery round of estimates after define approval 210.

Discovery consists of a discover planning step 124, a requirements modeling step 126, a contract LOE step 128, and an IT discover review step 130. In discover planning 124, resource planning might be done to determine the personnel who will perform the further discovery steps. In requirements modeling 126, a detailed analysis of the requirements for the project is performed and the requirements are documented. In contract LOE 128, firm estimates of the number of hours needed for each application to complete its portion of the project are provided. In IT discover review 130, the IT group performs another round of reviews of the estimates.

The second set of estimates can be sent to the sponsor in the discover approval step 220. In discover approval 220, the sponsor provides a second round of approval for the project and signs off on the project continuing through the small enhancement process 10. The define approval 210, discover approval 220, and user acceptance 230 steps that are shown in row 200 in FIG. 2 are all performed by the sponsor, while the steps in the row from IT review 116 through complete 140, as well as the requirements modeling 126 and contract LOE 128 steps, are performed by the IT group.

If the sponsor provides a second approval in discover approval 220, the project can move to a design step 132. The design of the components that are intended to meet the requirements of the project is carried out in design 132. In a software development project, for example, the software code might be designed in design 132. When design 132 is complete, the project can move to the completion phase 400 as described above.

In creating a project request, a sponsor can specify that, when certain criteria are met, certain steps in the evaluation phase 300 need not be followed. For example, for a simple project such as updating a table, both the sponsor and the IT group might have sufficient prior knowledge of the effort that will be needed to complete the project. An LOE estimate, a discovery process, and the sponsor approvals may not be needed in such a case and those steps might be bypassed. For a larger project, an LOE estimate might be needed to determine the path a project will take. The sponsor might give pre-approval for certain steps in the evaluation phase 300 to be bypassed when the LOE estimate indicates that the project is ultra-small. Other pre-approvals by the sponsor can allow other steps to be bypassed when other criteria are met.

Figure 3:
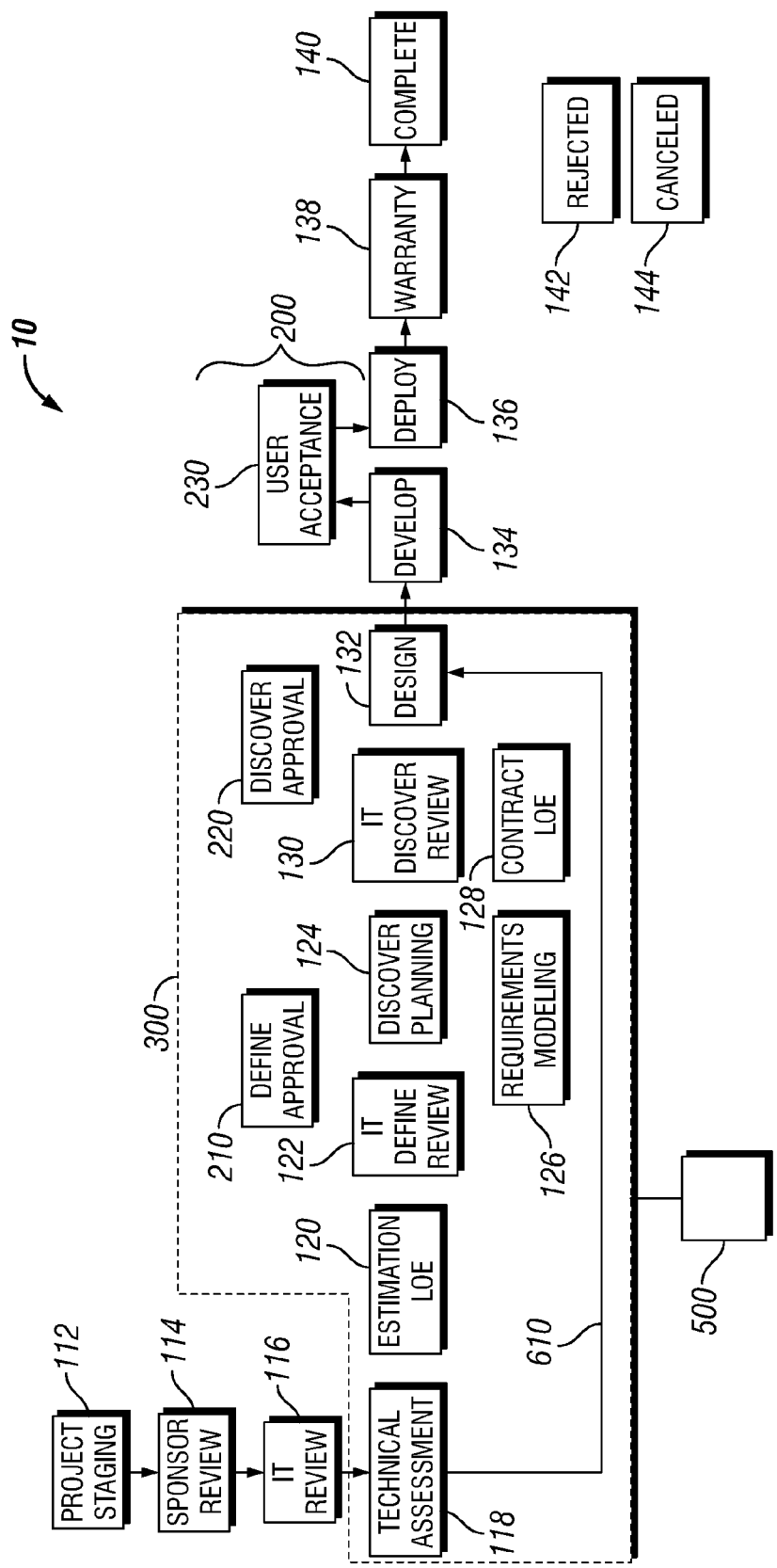
FIG. 3 is a block diagram illustrating another path of the development process according to an embodiment of the present disclosure.

FIG. 3 illustrates an embodiment in which several of the steps in the evaluation phase 300 can be bypassed. If the sponsor has specified that bypass path 610 can be followed when certain criteria are met, and if the technical assessment 118 determines that those criteria have been met, then bypass path 610 is followed. The criteria might include that a project be ultra-small, that the project not require any significant new hardware, that the project not significantly impact any critical systems, and/or similar conditions. The determination that the project is ultra-small is made in the technical assessment step 118 without a formal LOE estimation process.

If the appropriate conditions are met, the project can move directly from technical assessment 118 to design 132. Estimation LOE 120, IT define review 122, define approval 210, discover planning 124, requirements modeling 126, contract LOE 128, IT discover review 130, and discover approval 220 are bypassed. The criteria engine 500 might examine the project-related data obtained by the IT group in the technical assessment step 118 and the sponsor's pre-approvals that pertain to the technical assessment step 118 to determine whether bypass path 610 can be followed.

Figure 4:
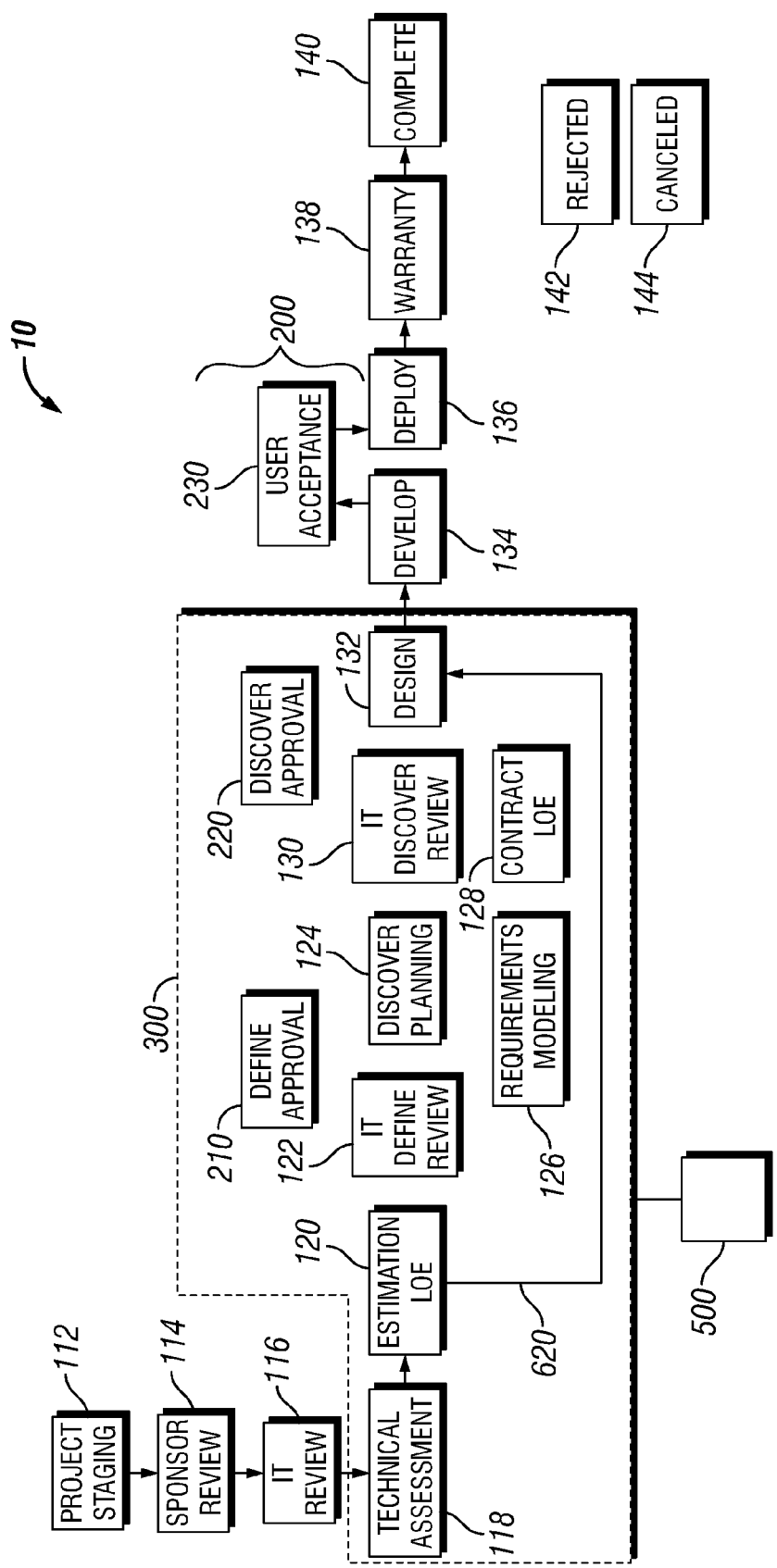
FIG. 4 is a block diagram illustrating another path of the development process according to an embodiment of the present disclosure.

FIG. 4 illustrates another embodiment in which steps in the evaluation phase 300 can be bypassed. If the technical assessment 118 cannot determine, without the benefit of a formal LOE estimate, whether a project is ultra-small, then bypass path 610 cannot be followed and the estimation LOE step 120 is performed. If the sponsor has specified that bypass path 620 can be followed when certain criteria are met, and if the estimation LOE step 120 determines that those criteria have been met, then bypass path 620 is followed. The criteria might again include that the project be ultra-small, that the project not require any significant new hardware, that the project not significantly impact any critical systems, and/or similar conditions. In this case, the determination that the project is ultra-small is made through a more formal LOE estimation process in the estimation LOE step 120.

If the appropriate conditions are met, the project can move directly from estimation LOE 120 to design 132. IT define review 122, define approval 210, discover planning 124, requirements modeling 126, contract LOE 128, IT discover review 130, and discover approval 220 are bypassed. The criteria engine 500 might examine the LOE estimate obtained by the IT group in the estimation LOE step 120 and the sponsor's pre-approvals that pertain to the estimation LOE step 120 to determine whether bypass path 620 can be followed. If the LOE estimate indicates that the project is not ultra-small, bypass path 620 typically cannot be followed.

Figure 5:
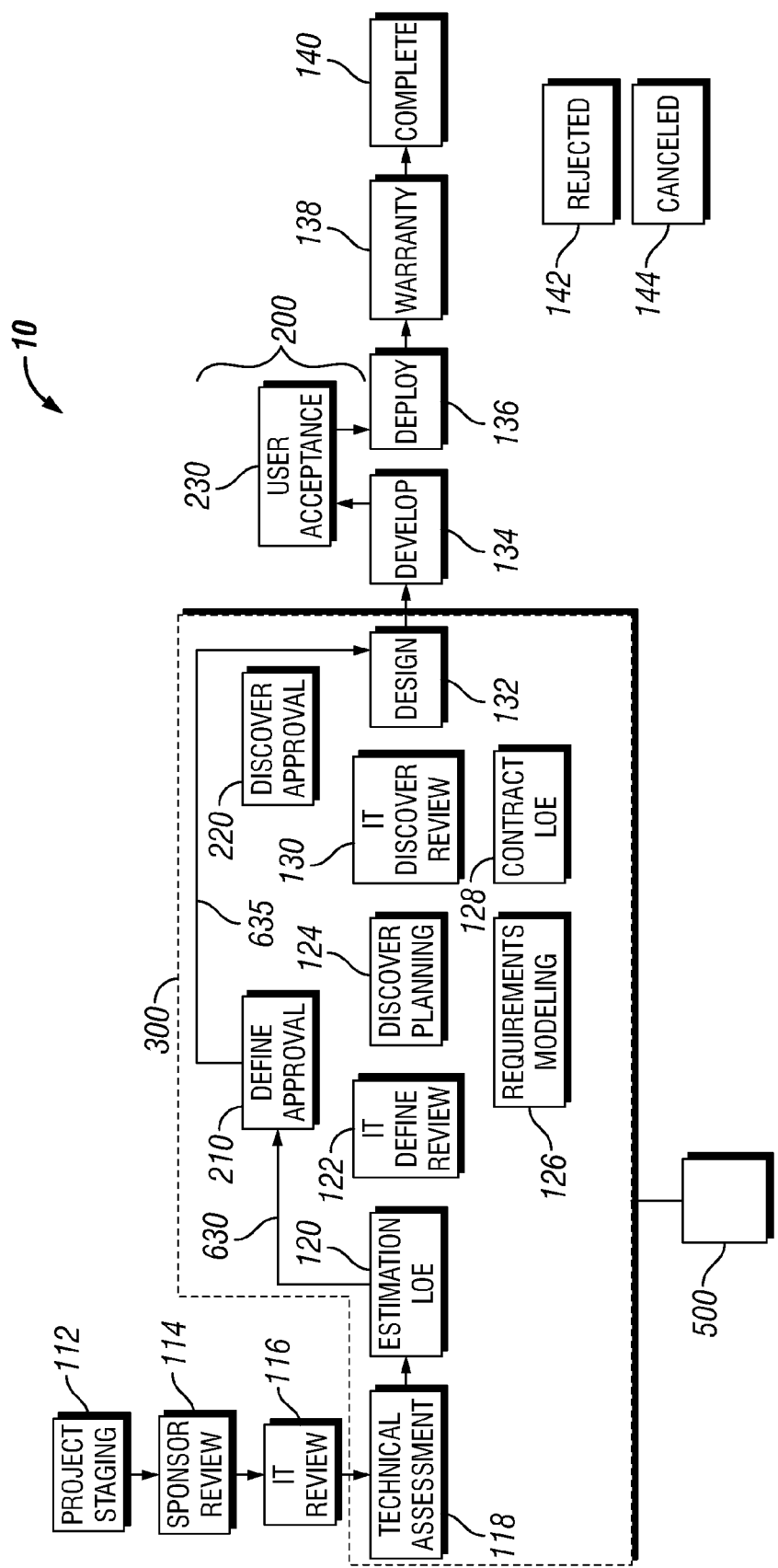
FIG. 5 is a block diagram illustrating another path of the development process according to an embodiment of the present disclosure.

FIG. 5 illustrates another embodiment in which steps in the evaluation phase 300 can be bypassed. The IT analysis performed up to and including the estimation LOE step 120 might indicate that a project is eligible to move directly from estimation LOE 120 to design 132. However, the sponsor might not have given a pre-approval for such a bypass to occur. In such a case, bypass path 630 might be followed from estimation LOE 120 to define approval 210. The sponsor might be informed that the project is ultra-small and meets other criteria that might allow a bypass to design 132. The sponsor might give approval at that point for the project to follow bypass path 635 and move directly from define approval 210 to design 132. If the sponsor does not grant approval to follow bypass path 635, the discovery process as described above is followed.

Figure 6:
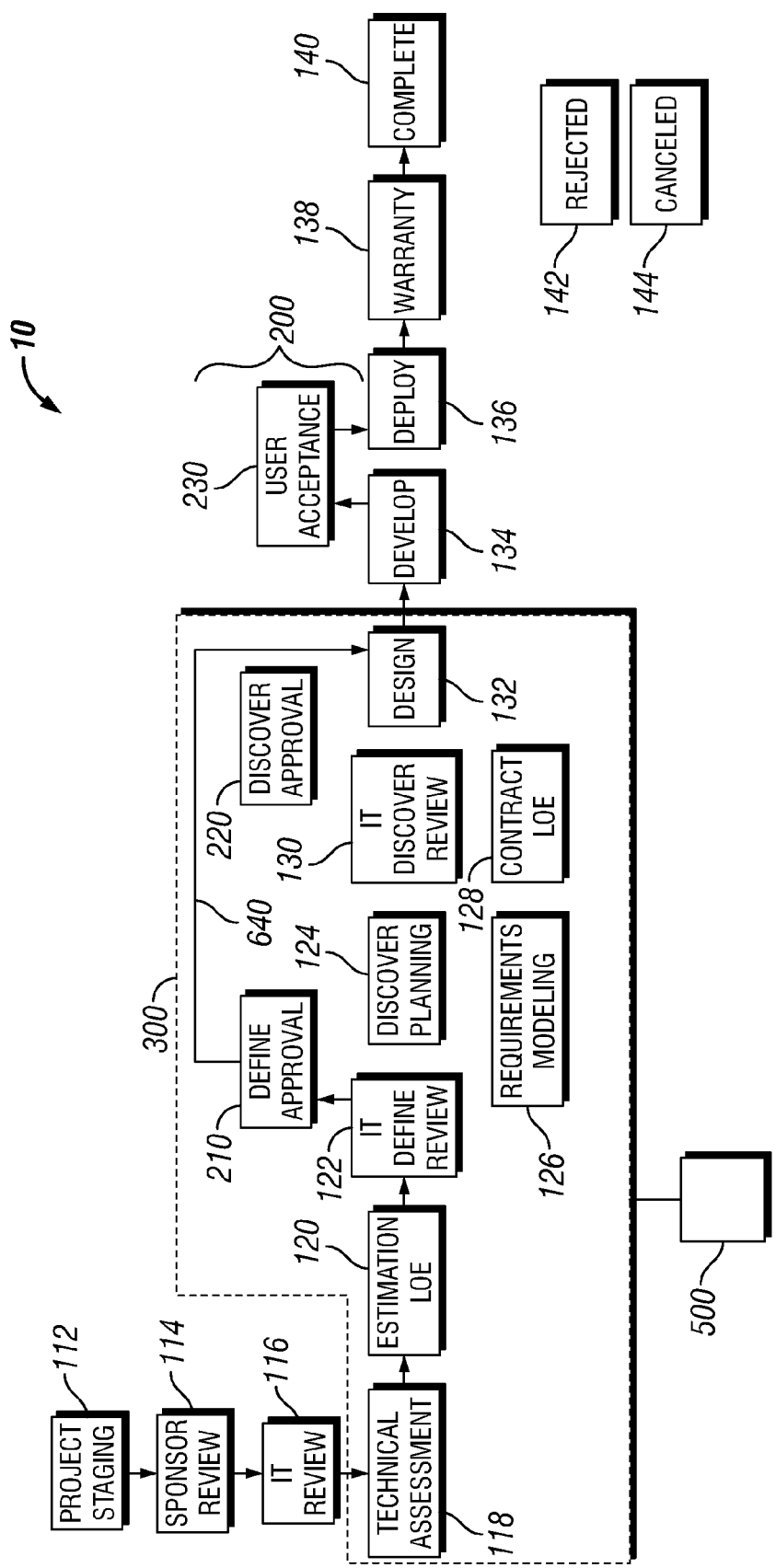
FIG. 6 is a block diagram illustrating another path of the development process according to an embodiment of the present disclosure.

FIG. 6 illustrates another embodiment in which steps in the evaluation phase 300 can be bypassed. If the estimation LOE step 120 determines that a project is not ultra-small, the project flow moves to the IT define review step 122 and a review as described above is performed. If the appropriate sign-offs are granted by the IT group in the IT define review step 122, the project moves to define approval 210. At this point, the sponsor might decide that a second round of analysis by the IT group is not necessary even though the project is not ultra-small.

For example, if the project is a straightforward activity like updating the fields of a database or if there is no multi-system impact or complex coding, further analysis may not be needed. The IT group might indicate that it is comfortable with the estimate it has provided and might ask the sponsor for approval to continue without performing a second round of analysis. The sponsor might agree with the IT group's assessment and approve bypass path 640 to be followed from define approval 210 to design 132. Discover planning 124, requirements modeling 126, contract LOE 128, IT discover review 130, and discover approval 220 are bypassed. If the sponsor does not approve the bypass; the discovery process is followed.

Figure 7:
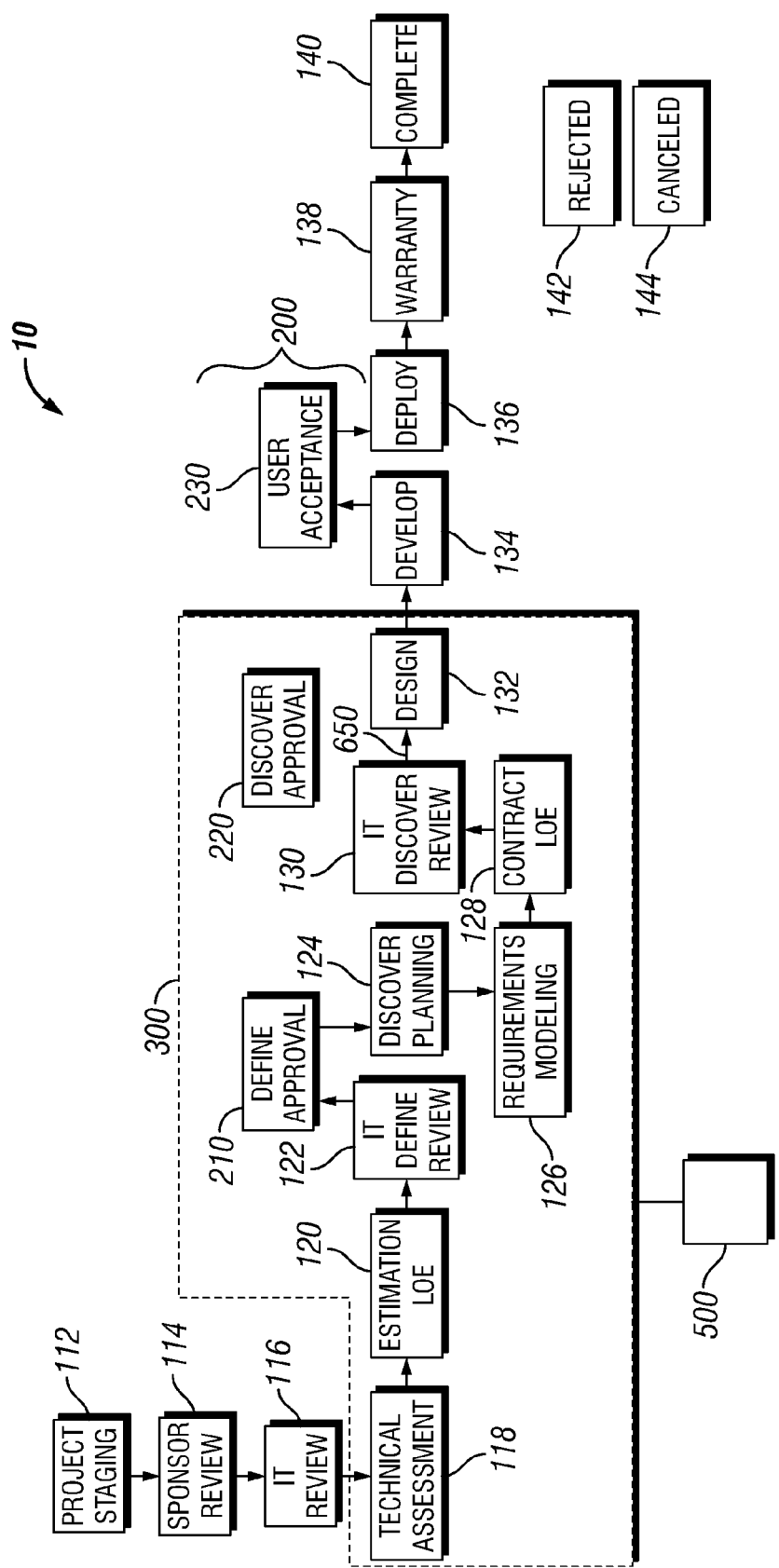
FIG. 7 is a block diagram illustrating another path of the development process according to an embodiment of the present disclosure.
Figure 9B:
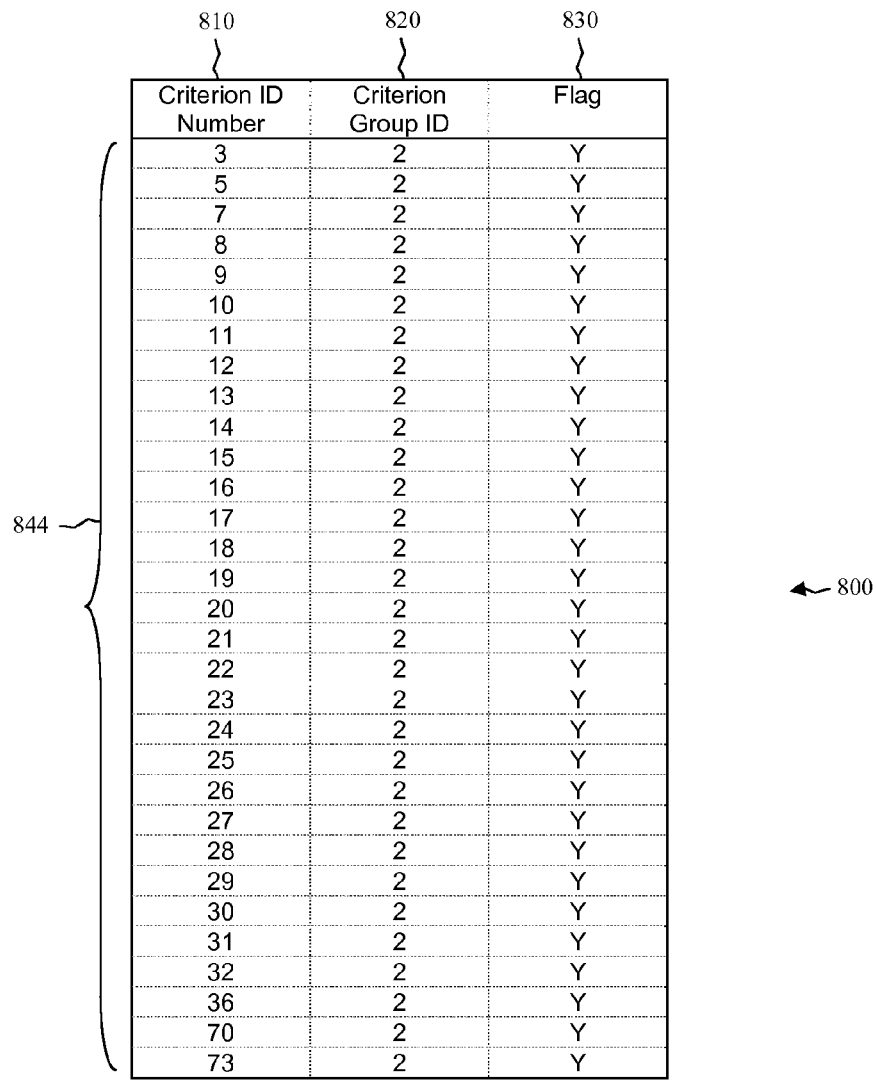

FIG. 7 illustrates another embodiment in which steps in the evaluation phase 300 can be bypassed. The sponsor approves the first set of estimates for a project in the define approval step 210. At that time, the sponsor might specify that, if the second round of estimates confirms the initial estimates, then the sponsor does not need to approve the second round of estimates. In that case, bypass path 650 can be followed directly from IT discover review 130 to design 132 and discover approval 220 can be bypassed.

For example, the IT group might provide the sponsor with an LOE of 1000 hours in the IT define review step 122. In define approval 210, the sponsor might specify that the IT group should follow the discovery process but that if the discovery process verifies that the project can be completed in under 1000 hours; then the IT group does not need to return to the sponsor for the discover approval step 220. The criteria engine 500 might examine the project-related data obtained by the IT group in the IT define review step 122 and the IT discover review step 130 and the sponsor's pre-approvals that pertain to the IT discover review step 130 to determine whether bypass path 650 can be followed.

At each step in the small enhancement process 10, a graphical user interface (GUI), a report, or some other type of information display might be present that allows users to see information related to the step and/or to the process as a whole. The GUI might have an appearance similar to the workflows shown in FIGS. 2-7. Users might be able to select an element in the GUI to retrieve additional information about the element. The underlying software that supports the display and retrieval of such information can be assumed to be present but is not depicted in the drawings.

If the estimated LOE for a project exceeds the limit for a small project (if the project is estimated to require more than 2000 hours, for example), the project typically cannot enter the small enhancement process. However, there is some flexibility so that a project that is only slightly over the small project threshold could still be approved to go through the small enhancement process. For example, a project that might be time-consuming but that is straightforward and might not require a great deal of analysis might be allowed to follow the small enhancement process. Such a project would typically be required to follow the longest path through the small enhancement process as illustrated in FIG. 2.

As such a project is progressing through the small enhancement process, it might be determined that the project is inappropriate for the small enhancement process and needs to follow a large-scale enterprise development process. When an enterprise follows an enterprise development process that contains steps similar to those in the small enhancement process, such a project might be moved to a similar step in the enterprise development process. The project might then be able to continue its progress in the enterprise development process at substantially the same point where it stopped in the small enhancement process. There may be no need to create a new project request or repeat actions that have already been taken.

It will be appreciate that while the current disclosure discusses multiple distinct paths to efficiently manage small projects based on certain criteria, a myriad of potential paths exist. For example, at each of the various stages or blocks, decision gates or check points may be provided to verify that the project is still on the correct path. In addition, certain actions such as change requests may automatically trigger an evaluation or reevaluation of whether the project is still on the appropriate path. Other examples of changes that could cause a change in project development processing include, changes in cost estimates, changes in the scale of a project, or changes to the list of impacted applications, or that more than one application has been subsequently identified as being impacted.

These check points or evaluation events may, for example, identify that elements of the project have changed which may cause the project process to advance to other points on one or more paths, or may cause the project to retreat one or more steps, or reset entirely to the beginning of the process. Also, the check points or evaluation events may identify changes to the project that necessitate the project flow to move backward one or more steps to repeat or verify steps or information, or perhaps move from the enterprise development process to the one or more of the small enhancements pipelines or vice versa. For example, a change request may trigger an evaluation that determines that the scope of the project has changed and that the project no longer qualifies as a small enhancement eligible for the shorter project development processes and instead should be placed in the more complex enterprise development process. The project may then enter the enterprise development process at an appropriate position, such as at estimation when, for example, the project was moved because at estimation the project no longer qualified as a small enhancement.

In addition to increasing efficiency by allowing the bypassing of certain steps, the small enhancement process can offer other benefits. For example, an automated notification system, such as an automated email system, might be used in conjunction with the small enhancement process to facilitate the progress of a project. When a step in the small enhancement process is completed, emails can automatically be sent to all parties who are involved with the subsequent step, informing the parties of the actions that need to be taken. This eliminates the need for face-to-face meetings between the parties involved in a project. Face-to-face meetings might be held only at regularly scheduled intervals and, without the small enhancement process, the progress of a project might be stalled until such a meeting is held.

The use of an automated notification system also allows notifications about significant events to occur in a timely manner. Emails can be sent automatically as soon as a significant event occurs rather than manual notifications being sent at the discretion of the personnel involved in the small enhancement process. An email can include a deadline by which a recipient must perform an appropriate action. A project may be prevented from progressing until an appropriate response to a notification email is received.

As an example, when the estimation LOE step 120 is complete, an email might automatically be sent to an appropriate representative of the IT group informing the representative that the IT define review step 122 needs to be performed. When the IT define review step 122 is complete, the sponsor can be automatically notified that the define approval step 210 needs to be performed. The notification might include a date by which approval is needed and might inform the sponsor that future steps in the small enhancement process cannot take place until an action is taken by the sponsor.

If the sponsor approves a bypass, the project flow might automatically move directly to the design step 132 and the appropriate personnel in the IT group might be informed that the design step 132 can begin. If the sponsor does not approve a bypass, the project flow might automatically move to the discover planning step 124 and the appropriate personnel in the IT group might be informed that the discover planning step 124 can begin. Similar notifications can occur at other points in the small enhancement process 10.

In the case where the automated notification system is an automated email system, the notification emails can contain buttons, links, or other standard input mechanisms that assist the recipient of an email in taking an action. For example, if an email is, sent to a sponsor requesting define approval or discover approval, the email might contain buttons that the sponsor can click to grant or deny approval of a bypass. The emails might also contain links that can take a recipient to a web page containing project-related information.

The automated notification system also aids in auditing and metrics collection by recording significant events that occur in the course of a project. Records of the notifications can be retained to allow automated maintenance of a history of when a project moved from one step to the next, when notifications occurred, who took which actions (such as viewing, editing, or approving project requests), and other information. The automation eliminates the need for humans to manually record this information and prevents the accidental or deliberate entry of incorrect information.

A project in the small enhancement process can be part of a stand-alone release as opposed to being part of a large-scale release where it is tied to multiple other projects. All projects in a large-scale release are typically moved into a production environment simultaneously. If a small enhancement project were part of a large release, the deployment of the small enhancement project into production might be delayed until other, possibly unrelated, projects are deployed. By being part of a stand-alone release, a small enhancement project can be moved into production when it is ready to be moved. A validation might be performed to ensure that the small enhancement project is tied to an appropriate stand-alone release.

Returning to FIG. 1, it was stated previously that the criteria engine 500 can examine project criteria and specifications at a particular step in the small enhancement process 10, can examine any sponsor pre-approvals related to that step, and, based on this information, can determine the appropriate path that the small enhancement process 10 should follow. Details on how the criteria engine 500 performs these actions are now provided.

In an embodiment, the criteria engine 500 consists of a set of database tables or similar data sets. A first table relates each path through the small enhancement process 10 to a criterion group ID. FIG. 8 illustrates an example of such a table 700. The table 700 contains a column 710 of criterion group IDs. A second column 720 lists paths through the small enhancement process 10 that correspond to the criterion group IDs.

A second table relates each criterion group ID to a different set of criterion ID numbers. FIGS. 9a-9e illustrate an example of such a table 800. The table 800 contains a column 810 of criterion ID numbers. Various sets of these criterion ID numbers are associated with criterion group IDs in column 820. A criterion group ID in column 820 of table 800 corresponds to a similarly numbered criterion group ID in column 710 of table 700. A third column 830 contains flags that can activate or deactivate a project criterion by flagging the criterion ID number of the project criterion with a "yes" or a "no" or some other binary designation.

A third table relates each criterion ID number to a criterion by which a project can be categorized. FIGS. 10a-10c illustrate an example of such a table 900. The table 900 contains a column 920 of descriptions of project criteria and a column 910 of criterion ID numbers, each of which uniquely identifies a criterion description. A criterion ID number in column 910 of table 900 corresponds to a similarly numbered criterion. ID number in column 810 of table 800.

In the initial stages of a project and/or at various points during the course of a project, various parties involved in the project, such as the sponsor, the IT project manager, the solutions architect, and other roles, answer questions related to the project. The questions correspond to the criteria listed in the criterion description column 920 in FIG. 10. The answers to the questions can be referred to as the project specifications and would typically be stored in or accessible to the criteria engine 500. The project specifications can determine the path the project takes through the small enhancement process 10.

As an example, it might be required that a set of questions be answered in the affirmative before a project can move from project staging 112 to sponsor review 114. The criteria engine 500 is able to consult table 700 and determine that the path to sponsor review 114 corresponds to criterion group ID 10, as shown on line 742 of FIG. 8. The criteria engine 500 is then able to consult table 800 and determine that criterion group ID 10 corresponds to criterion ID numbers 38, 39, 40, 41, 42, 43, 46, and 47 as shown in section 852 of FIG. 9d. The criteria engine 500 is then able to consult table 900 of FIG. 10b and determine that criterion ID numbers 38, 39, 40, 41, 42, 43, 46, and 47 refer to the role assignment and data validation criteria listed with those criterion ID numbers in table 900.

The criteria engine 500 then consults the project specifications to determine whether those role assignment and data validation criteria have been appropriately fulfilled. If the project specifications indicate that the questions corresponding to criterion ID numbers 38, 39, 40, 41, 42, 43, 46, and 47 have been answered affirmatively, then the criteria engine 500 allows the small enhancement process 10 to move to the sponsor review step 114.

A similar process could be followed when the small enhancement process 10 moves from the sponsor review step 114 to the IT review step 116. The criteria engine 500 consults table 700 and determines that movement to the IT review step 116 is controlled by criterion group ID 11, as shown on line 744 of table 700. The criteria engine 500 then consults table 800 and determines that criterion group ID 11 consists of criterion ID numbers 38, 39, 40, 41, 42, 43, 44, 45, 46, 47, 48, and 72, as shown in section 854 of table 800. Table 900 specifies the criteria referred to by criterion ID numbers 38, 39, 40, 41, 42, 43, 44, 45, 46, 47, 48, and 72. If the project specifications indicate that these criteria are fulfilled, the small enhancement process 10 can move from sponsor review 114 to IT review 116.

Similar procedures can be followed for movement to the technical assessment 118, user acceptance 230, and warranty 138 steps, which correspond to criterion group IDs 13, 18, and 19, respectively, as shown on lines 746, 756, and 758 in table 700. These criterion group IDs correspond to the criterion ID numbers in sections 856, 866, and 868, respectively, of table 800. The criterion descriptions that correspond to those criterion ID numbers can be found in table 900.

Movement through the above-mentioned steps (i.e., through the initial phase 100 and the completion phase 400 shown in FIG. 1) is typically sequential and for the most part deals with relatively straightforward criteria such as data validation and role assignments. In the evaluation phase 300, different paths can be followed depending on sponsor pre-approvals and on project criteria and specifications that might be more complex.

For example, when the technical assessment step 118 is complete, one of two paths can be followed. In one case, the estimation step 120 is performed, as shown in FIG. 2. Alternatively, bypass path 610 might be followed from technical assessment 118 to design 132, as shown in FIG. 3. To determine which, path is taken, the criteria engine 500 first attempts to determine whether bypass path 610 can be followed. In table 700, bypass path 610 is referred to as SE Path 1 and corresponds to criterion group ID 1, as shown on line 732. Table 800 is then consulted and it shows that criterion group ID 1 consists of the criterion ID numbers in section 842 of table 800.

The criteria engine 500 retrieves the criterion descriptions corresponding to these criterion ID numbers from table 900 and determines whether those criteria have been met. For example, one of the criterion ID numbers in criterion group ID 1 is criterion ID number 1. Table 900 shows that this criterion ID number corresponds to the criterion description, "Preauthorized spending limit is between 1 and 300 hours". The criteria engine 500 checks the project specifications to determine the actual preauthorized spending limit and compares that limit to the range in criterion ID number 1.

If the limit is within the specified range, criterion ID number 1 is considered to be fulfilled and another criterion in criterion group ID 1 can be checked. For example, criterion ID number 2 states, "This project can be accomplished within the preauthorized spending limit". If the project specifications verify that the project can be accomplished within this limit, criterion ID number 2 is met and another criterion can be checked. All of the criteria in criterion group ID 1 are checked in this manner and if all of the criteria are fulfilled, the project can follow bypass path 610 to the design step 132.

If any of the criteria in criterion group ID 1 are not met, the project cannot follow bypass path 610 and the criteria engine 500 checks whether the process can flow to the estimation LOE step 120. Table 700 shows that movement to Estimation LOE 120 corresponds to criterion group ID 14, as shown on line 748. Table 800 shows that criterion group ID 14 corresponds to the criteria in section 858 of table 800, namely criterion ID numbers 55, 56, 57, and 58. The criteria engine 500 consults table 900 to find the criterion descriptions that correspond to those criterion ID numbers and checks the project specifications to determine if those criteria have been met. If the criteria have been met, the project moves to Estimation LOE 120.

When a project is ready to move out of Estimation LOE 120, three different paths can be followed, a direct path to IT define review 122, bypass path 620 to design 132, or bypass path 630 to define approval 210. The criteria engine 500 might first check whether bypass path 620 can be followed as shown in FIG. 4. Bypass path 620 corresponds to SE Path 2 in table 700, which in turn corresponds to criterion group ID 2, as shown on line 734 of table 700. Criterion group ID 2 corresponds to the criterion ID numbers in section 844 of table 800.

The criteria engine 500 checks the criteria in table 900 that correspond to these criterion ID numbers and checks the project specifications to determine if those criteria have been met. If all of the criteria have been met, the project can follow bypass path 620 to design 132. If any of the criteria have not been met, bypass path 620 cannot be followed and the criteria engine 500 checks whether bypass path 630, as shown in FIG. 5, can be followed.

Bypass path 630 corresponds to SE Path 3 in table 700, which in turn corresponds to criterion group ID 3, as shown on line 736. Criterion group ID 3 corresponds to the criterion ID numbers in section 846 of table 800. The criteria engine 500 checks the criteria in table 900 that correspond to these criterion ID numbers and checks the project specifications to determine if those criteria have been met. If all of the criteria have been met, the project can follow bypass path 630 to define approval 210. The sponsor might then allow the project to follow path 635 to the design step 132. If any of the criteria have not been met, bypass path 630 cannot be followed and the criteria engine 500 checks whether the process can flow to IT define review 122.

Table 700 shows that movement to IT define review 122 corresponds to criterion group ID 22, as shown on line 764. Table 800 shows that criterion group ID 22 corresponds to the criterion in section 874 of table 800, namely criterion ID number 74. The criteria engine 500 consults table 900 to find the criterion description that corresponds to that criterion ID number and checks the project specifications to determine if that criterion has been met. If the criterion has been met, the project moves to IT define review 122.

Similar procedures can be followed for the other bypass paths through the small enhancement process 10. For example, bypass path 640 shown in FIG. 6 and bypass path 650 shown in FIG. 7 correspond to SE Path 4 and SE Path 5 in table 700, respectively. These paths in turn correspond to criterion group ID 4 and criterion group ID 5, as shown on lines 738 and 740 of table 700. Criterion group ID 4 and criterion group ID 5 correspond to the criterion ID numbers in sections 848 and 850, respectively, of table 800. In a manner similar to that described above, the criteria engine 500 checks the criteria corresponding to these criterion ID numbers to determine whether a bypass path can be followed.

If bypass path 640 or 650 cannot be followed, the full path through the small enhancement process 10 as shown in FIG. 2 would typically be followed. That is, a path might be followed from IT define review 122 to define approval 210 to discover planning 124 to requirements modeling 126 to contract LOE 128 to IT discover review 130 to discover approval 220 to design 132. The movements to define approval 210, discover planning 124, IT discover review 130, discover approval 220, and design 132 correspond to criterion group IDs 15, 20, 17, 16, and 21, respectively, as shown on lines 750, 760, 754, 752, and 762 of table 700.

These criterion group IDs, in turn, correspond to the criterion ID numbers in sections 860, 870, 864, 862, and 872 of table 800. Table 900 shows that the criterion descriptions that correspond to these criterion ID numbers generally refer to straightforward data validation procedures that ensure that enough information has been provided to allow a project to move from one step to the next.

The use of tables, such as tables 700, 800, and 900, offers a greater degree of flexibility than would be available if the path determination logic of the small enhancement process were hard coded. Criterion descriptions in table 900 can easily be modified and criteria can easily be added or deleted. Criterion ID numbers in table 800 can easily be added to, deleted from, or moved between criterion group IDs to modify the criteria that must be met for a particular path to be followed or to create new paths. The flags in column 830 of table 800 allow criteria to be temporarily removed from or added to a criterion group ID by setting the flags to "no" or "yes". Paths can easily be added to or deleted from table 700.

Figure 11:
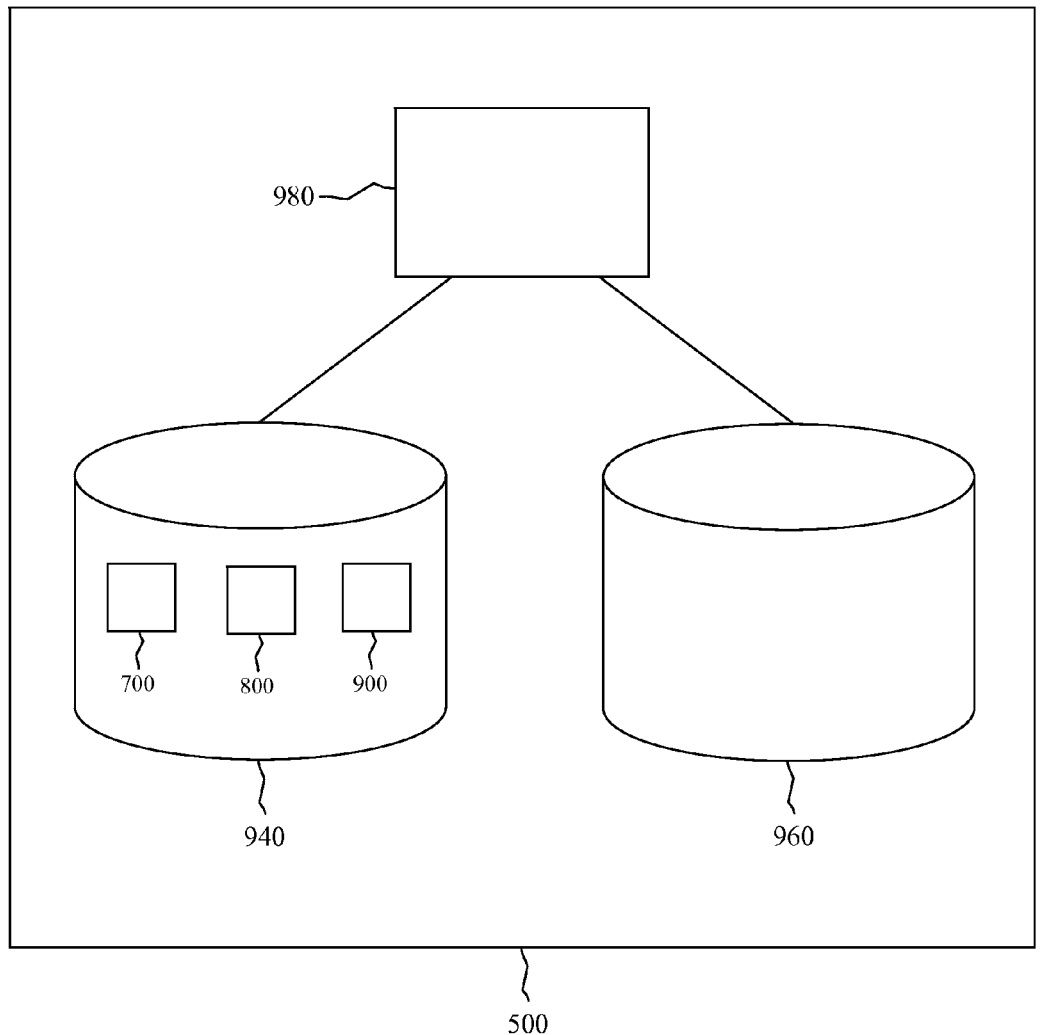
FIG. 11 is a block diagram of a system for controlling a development process according to an embodiment of the present disclosure.

FIG. 11 illustrates components that might be present in an embodiment of the criteria engine 500. A data store 940 holds the tables 700, 800, and 900. Another data store 960 holds the project specifications provided by the sponsor, the IT group, and/or other entities. The project specifications might include sponsor pre-approvals for bypasses, LOE estimates, role assignments, sign-offs, and other information that might be used to determine the path a project will take.

The data stores 940 and 960 might be separate as shown or might be combined into a single data store. The data stores 940 and 960 might be relational databases, data stores that follow the Lightweight Directory Access Protocol (LDAP), or some other type of data store or portion of a data store. The tables 700, 800, and 900 might be separate tables as shown or might combined into one or more tables. For example, a single table might hold the data contained in tables 700, 800, and 900. An appropriate design of the fields of the single table might allow the single table to operate in a manner similar to the operation of the separate tables 700, 800, and 900 as described above. The tables might be maintained in a single data store 940 as shown or might be divided across multiple data stores. Other data storage arrangements will be evident to one of skill in the art and should be considered within the scope of this specification.

A control component 980 can read the data in the data stores 940 and 960 and determine an appropriate path for a project based on a comparison of the project specifications in data store 960 and the project criteria in tables 700, 800, and 900. The control component 980 might be a set of Java classes or a similar software program capable of executing the logical steps necessary to extract data from the data stores 940 and 960 and take appropriate actions based on the extracted data.

For example, the control component 980 might determine that two paths are available from a particular step in the small enhancement process, a path that bypasses one or more steps and a path that does not bypass any steps. The control component 980 would typically first determine whether the bypass path can be taken by comparing the project criteria that must be met for a bypass to occur with the project specifications related to those criteria.

If the project specifications indicate that the criteria are met, the control component 980 causes the bypass to occur. If the project specifications indicate that the criteria are not met, the control component 980 determines whether the non-bypass path can be taken by comparing the project criteria that must be met for that path to be taken with the project specifications related to those criteria. If the criteria are met, the control component 980 causes that path to be taken.

Figure 12:
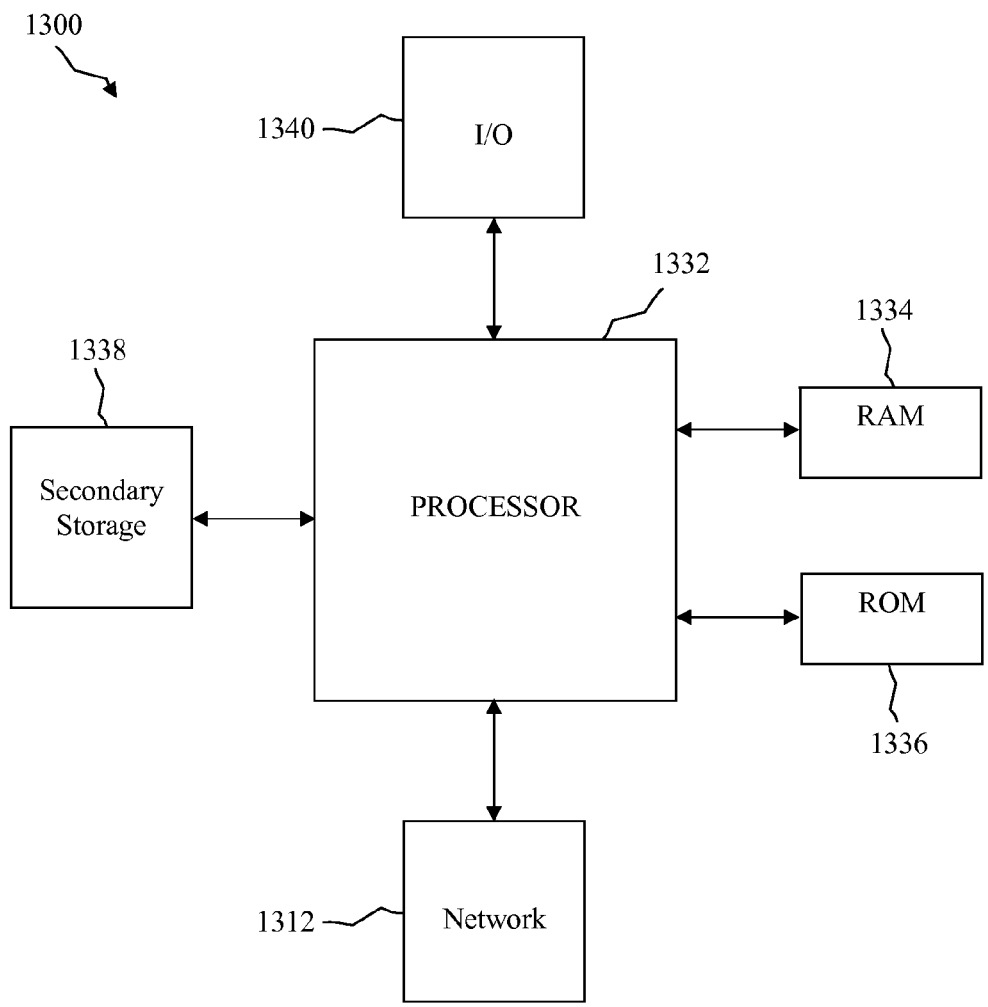
FIG. 12 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 12 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A computer-implemented system for selecting a workflow path of a software development project comprising:

a criteria engine stored on a computer readable storage medium and executable by a processor to evaluate project criteria of the software development project at one or more steps in an evaluation phase of a first enterprise development process responsive to a change in the project criteria comprising at least one of a change request, a change in cost estimates, a change in a scale of the software development project, a change to a list of impacted enterprise applications, and a change reflecting that more than one enterprise application has been subsequently identified as being impacted, wherein the project criteria comprises information about parameters of the software development project, and wherein the evaluation phase comprises a static workflow that includes a plurality of static workflow paths through the static workflow, each of the plurality of static workflow paths includes a static set of steps, the criteria engine further executable to determine at the one or more steps whether the software development project should proceed to one of a next step in a currently selected path of the plurality of static workflow paths and a next step in a different path of the plurality of static workflow paths in the evaluation phase based on the evaluation of the project criteria responsive to the change in the project criteria and route the software development project to one of the next step in the currently selected path and the next step in the different path based on the determination; wherein the determination and routing are based on an estimate of the number of hours needed to complete the software development project and a pre-approval by a sponsor to bypass one or more steps when the estimate is below a threshold, wherein a first workflow path of the plurality of static workflow paths comprises a technical assessment step, an estimation level of effort (LOE) step, an information technology (IT) define review step, a define approval step, a discover planning step, a requirements modeling step, a contract LOE step, an IT discover review step, a discover approval step, and a design step, wherein a second workflow path of the plurality of static workflow paths comprises the technical assessment and the design step, wherein a third workflow path of the plurality of static workflow paths comprises the technical assessment, the estimation LOE step, and the design step, wherein a fourth workflow path of the plurality of static workflow paths comprises the technical assessment step, the estimation LOE step, the define approval step, and the design step, wherein a fifth workflow path of the plurality of static workflow paths comprises the technical assessment step, the estimation LOE step, the IT define review step, the define approval step, and the design step, wherein a sixth workflow path of the plurality of static workflow paths comprises the technical assessment step, the estimation LOE step, the IT define review step, the define approval step, the discover planning step, the requirements modeling step, the contract LOE step, the IT discover review step, and the design step, wherein the first, second, third, fourth, fifth, and sixth workflow paths are different, wherein only small software development projects or ultra-small development projects are eligible for one of the plurality of static workflow paths of the evaluation phase, wherein small software development projects are defined as in a range of about 2,000 or fewer hours and not impacting more than one enterprise application, and wherein ultra-small development projects are defined as in a range of 300 or fewer hours.

2. The system of claim 1, wherein prior to the evaluation phase the software development project is in an initial phase that comprises a project staging step, a sponsor review step, and an IT review step, and wherein a completion phase comprises a develop step, a user acceptance step, a deploy step, a warranty step, and a complete step.

3. The computer-implemented system of claim 1, wherein the criteria engine re-evaluates the project criteria in response to the change request.

4. The computer-implemented system of claim 1, wherein the criteria engine re-evaluates the project criteria after each step.

5. The computer-implemented system of claim 1, wherein the criteria engine initially selects the currently selected path of the plurality of static workflow paths for the software development project, and in response to the change in the project criteria, the criteria engine routes the software development project to the different path of the plurality of static workflow paths.

6. The computer-implemented system of claim 1, wherein the criteria engine is further executable to route the software development project to a second enterprise development process based on another evaluation of the project criteria.

7. The computer-implemented system of claim 1, wherein the criteria engine is further executable to reroute the software development project to one or more prior steps.

8. A development system for a small software development project comprising:

a selection component stored on a computer readable storage medium and executable by a processor to evaluate a plurality of project specifications of the software development project at one or more steps in an evaluation phase responsive to a change in the plurality of project specifications, wherein the plurality of project specifications comprises information about parameters of the software development project, and wherein the evaluation phase comprises a static workflow that includes a plurality of static workflow paths through the static workflow, each of the plurality of static workflow paths includes a static set of steps, the selection component further executable to determine at the one or more steps whether the software development project should proceed to one of a next step in a current path of the plurality of static workflow paths and a next step in a different path of the plurality of static workflow paths in the evaluation phase based on the evaluation of the plurality of project specifications responsive to the change in the project criteria and route the software development project to one of the next step of the current path and the next step of the different path in the evaluation phase based on the determination, wherein at least one of the project specifications include that the software development project is in a range of about 2,000 or fewer hours and not impacting more than one enterprise application, wherein the determination and routing are based on an estimate of the number of hours needed to complete the software development project and a pre-approval by a sponsor to bypass one or more steps when the estimate is below a threshold, wherein a first workflow path of the plurality of static workflow paths comprises a technical assessment step, an estimation level of effort (LOE) step, an information technology (IT) define review step, a define approval step, a discover planning step, a requirements modeling step, a contract LOE step, an IT discover review step, a discover approval step, and a design step, wherein a second workflow path of the plurality of static workflow paths comprises the technical assessment and the design step, wherein a third workflow path of the plurality of static workflow paths comprises the technical assessment, the estimation LOE step, and the design step, wherein a fourth workflow path of the plurality of static workflow paths comprises the technical assessment step, the estimation LOE step, the define approval step, and the design step, wherein a fifth workflow path of the plurality of static workflow paths comprises the technical assessment step, the estimation LOE step, the IT define review step, the define approval step, and the design step, wherein a sixth workflow path of the plurality of static workflow paths comprises the technical assessment step, the estimation LOE step, the IT define review step, the define approval step, the discover planning step, the requirements modeling step, the contract LOE step, the IT discover review step, and the design step, wherein the first, second, third, fourth, fifth, and sixth workflow paths are different, wherein only small software development projects or ultra-small development projects are eligible for one of the plurality of static workflow baths of the evaluation phase, wherein small software development projects are defined as in a range of about 2,000 or fewer hours and not impacting more than one enterprise application, and wherein ultra-small development projects are defined as in a range of 300 or fewer hours.

9. The development system of claim 8, wherein the estimation LOE step, the IT define review step, the define approval step, the discover planning step, the requirements modeling step, the contract LOE step, the IT discover review step, and the discover approval step are bypassed when the technical assessment step determines that the software development project is ultra-small and a sponsor has pre-approved the bypassing when the technical assessment step determines that the software development project is ultra-small.

10. The development system of claim 8 wherein the IT define review step, the define approval step, the discover planning step, the requirements modeling step, the contract LOE step, the IT discover review step, and the discover approval step are bypassed when the estimation LOE step determines that the software development project is ultra-small and a sponsor has pre-approved the bypassing when the estimation LOE step determines that the software development project is ultra-small.

11. The development system of claim 8, wherein the IT define review step, the discover planning step, the requirements modeling step, the contract LOE step, the IT discover review step, and the discover approval step are bypassed when the estimation LOE step determines that the software development project is ultra-small and a sponsor approves the bypassing in the define approval step.

12. The development system of claim 8, wherein the discover planning step, the requirements modeling step, the contract LOE step, IT discover review step, and the discover approval step are bypassed when the sponsor approves the bypassing in the define approval step.

13. The development system of claim 8, wherein the discover approval step is bypassed when the IT discover review step determines that an estimate from the IT define review step is valid and the sponsor has pre-approved the bypassing when the IT discover review step determines that the estimate from the IT define review step is valid.

14. The development system of claim 8, wherein when a step is complete, an appropriate party is automatically notified that a subsequent step can begin.

15. A method for managing the progress of a software development project through a development process comprising:
selecting, by a criteria engine stored on a computer readable storage medium and executable by a processor, a current path of a plurality of static workflow paths of an evaluation phase based on a project criteria of the software development project, wherein the project criteria comprises information about parameters of the software development project, and wherein the evaluation phase comprises a static workflow that includes the plurality of static workflow paths through the static workflow, each of the plurality of static workflow paths includes a static set of steps;
evaluating, by the criteria engine, the project criterion at one or more steps in the evaluation phase responsive to a change in the project criteria;
determining, by the criteria engine, at the one or more steps, whether the software development project should proceed to one of a next step in the current path of the plurality of static workflow paths and a next step in a different path of the plurality of static workflow paths in the evaluation phase based on the evaluation of the project criteria made responsive to the change in the project criteria;
routing, by the criteria engine, the software development project to the next step in the different path of the plurality of static workflow paths based on the determination; and
performing a development process on the software development project based on the routing,
wherein the determination and routing are based on an estimate of the number of hours needed to complete the software development project and a pre-approval by a sponsor to bypass one or more steps when the estimate is below a threshold,
wherein a first workflow path of the plurality of static workflow paths comprises a technical assessment step, an estimation level of effort (LOE) step, an information technology (IT) define review step, a define approval step, a discover planning step, a requirements modeling step, a contract LOE step, an IT discover review step, a discover approval step, and a design step,
wherein a second workflow path of the plurality of static workflow paths comprises the technical assessment and the design step,
wherein a third workflow path of the plurality of static workflow paths comprises the technical assessment, the estimation LOE step, and the design step,
wherein a fourth workflow path of the plurality of static workflow paths comprises the technical assessment step, the estimation LOE step, the define approval step, and the design step,
wherein a fifth workflow path of the plurality of static workflow paths comprises the technical assessment step, the estimation LOE step, the IT define review step, the define approval step, and the design step,
wherein a sixth workflow path of the plurality of static workflow paths comprises the technical assessment step, the estimation LOE step, the IT define review step, the define approval step, the discover planning step, the requirements modeling step, the contract LOE step, the IT discover review step, and the design step,
wherein the first, second, third, fourth, fifth, and sixth workflow paths are different,
wherein only small software development projects or ultra-small development projects are eligible for one of the plurality of static workflow paths of the evaluation phase,
wherein small software development projects are defined as in a range of about 2,000 or fewer hours and not impacting more than one enterprise application, and
wherein ultra-small development projects are defined as in a range of 300 or fewer hours.

* * * * *